(12) United States Patent
Horn et al.

(10) Patent No.: US 12,052,601 B2
(45) Date of Patent: Jul. 30, 2024

(54) TECHNIQUES FOR JOINT MODULATION OF DATA WITH TONE RESERVATION SIGNALS

(71) Applicant: QUALCOMM Incorporated, San Diego, CA (US)

(72) Inventors: Idan Michael Horn, Hod Hasharon (IL); Shay Landis, Hod Hasharon (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 473 days.

(21) Appl. No.: 17/505,493

(22) Filed: Oct. 19, 2021

(65) Prior Publication Data

US 2023/0120730 A1 Apr. 20, 2023

(51) Int. Cl.
| | |
|---|---|
| *H04W 48/16* | (2009.01) |
| *H04L 5/00* | (2006.01) |
| *H04L 27/26* | (2006.01) |
| *H04W 28/02* | (2009.01) |
| *H04W 72/0453* | (2023.01) |
| *H04W 72/51* | (2023.01) |

(52) U.S. Cl.
CPC ....... *H04W 28/0215* (2013.01); *H04L 5/0007* (2013.01); *H04L 27/2618* (2013.01); *H04W 48/16* (2013.01); *H04W 72/0453* (2013.01); *H04W 72/51* (2023.01)

(58) Field of Classification Search
CPC .............................. H04W 72/12; H04W 72/16
USPC .......................................................... 370/329
See application file for complete search history.

(56) References Cited

U.S. PATENT DOCUMENTS

2010/0074130 A1* 3/2010 Bertrand ............. H04L 27/2692
370/252

* cited by examiner

*Primary Examiner* — Angel T Brockman
(74) *Attorney, Agent, or Firm* — Holland & Hart LLP

(57) ABSTRACT

Methods, systems, and devices for wireless communications are described. A user equipment (UE) may transmit a first message indicating a capability of the UE to jointly modulate data with tone reservation signals on an individual subcarrier basis. Accordingly, the UE may receive a second message activating joint modulation of data with tone reservation signals for the UE. In some examples, the UE may also receive control signaling indicating various parameters to use for joint modulation of data with tone reservation signals. The UE may communicate with a base station over multiple subcarriers in accordance with the second message and the control signaling, where one or more of the multiple subcarriers carry data jointly modulated with tone reservation signals on an individual subcarrier basis. The described techniques may enable the UE to perform wireless communications with higher throughput, reduced power consumption, and improved spectral efficiency, among other benefits.

30 Claims, 18 Drawing Sheets

TECHNIQUES FOR JOINT MODULATION OF DATA WITH TONE RESERVATION SIGNALS

FIELD OF TECHNOLOGY

The following relates to wireless communications, including techniques for joint modulation of data with tone reservation signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, power amplifiers (PAs) of devices operating in higher frequency ranges may consume a large amount of power. One approach to reducing the power consumption of a PA is to reduce the peak to average power ratio (PAPR) of waveforms amplified by the PA. Decreasing PAPR may reduce the input voltage to the PA, thereby enabling the PA to operate with greater power efficiency. One method for reducing PAPR involves projecting time-domain signal peaks of a waveform onto reserved subcarriers with an inverse sign. These time-domain signal peaks, otherwise known as tone reservation signals, may constructively combine with what is transmitted on other subcarriers of the waveform to reduce the PAPR of the waveform.

SUMMARY

The described techniques relate to improved methods, systems, devices, and apparatuses that support techniques for joint modulation of data with tone reservation signals. Generally, the described techniques provide for modulating data with tone reservation signals on an individual subcarrier basis. In some examples, a user equipment (UE) may transmit a first message indicating a capability of the UE to jointly modulate data with tone reservation signals on an individual subcarrier basis. Accordingly, the UE may receive a second message activating joint modulation of data with tone reservation signals for the UE. In some examples, the UE may also receive control signaling indicating various parameters (e.g., a quantity of spatial layers, a quantity of subcarriers) to use for joint modulation of data with tone reservation signals. The UE may communicate with a base station over multiple subcarriers in accordance with the second message and the control signaling, where one or more of the multiple subcarriers carry data jointly modulated with tone reservation signals on an individual subcarrier basis. The described techniques may enable the UE to perform wireless communications with higher throughput, reduced power consumption, and improved spectral efficiency, among other benefits.

A method for wireless communications at a UE is described. The method may include transmitting a first message indicating a capability of the UE to jointly modulate data with tone reservation signals on an individual subcarrier basis, receiving, from a base station and based on the first message, a second message activating joint modulation of data with tone reservation signals for the UE, and communicating with the base station over multiple subcarriers in accordance with the second message, where one or more subcarriers of the multiple subcarriers carry data jointly modulated with tone reservation signals on the individual subcarrier basis.

An apparatus for wireless communications at a UE is described. The apparatus may include a processor, memory coupled with the processor, and instructions stored in the memory. The instructions may be executable by the processor to cause the apparatus to transmit a first message indicating a capability of the UE to jointly modulate data with tone reservation signals on an individual subcarrier basis, receive, from a base station and based on the first message, a second message activating joint modulation of data with tone reservation signals for the UE, and communicate with the base station over multiple subcarriers in accordance with the second message, where one or more subcarriers of the multiple subcarriers carry data jointly modulated with tone reservation signals on the individual subcarrier basis.

Another apparatus for wireless communications at a UE is described. The apparatus may include means for transmitting a first message indicating a capability of the UE to jointly modulate data with tone reservation signals on an individual subcarrier basis, means for receiving, from a base station and based on the first message, a second message activating joint modulation of data with tone reservation signals for the UE, and means for communicating with the base station over multiple subcarriers in accordance with the second message, where one or more subcarriers of the multiple subcarriers carry data jointly modulated with tone reservation signals on the individual subcarrier basis.

A non-transitory computer-readable medium storing code for wireless communications at a UE is described. The code may include instructions executable by a processor to transmit a first message indicating a capability of the UE to jointly modulate data with tone reservation signals on an individual subcarrier basis, receive, from a base station and based on the first message, a second message activating joint modulation of data with tone reservation signals for the UE, and communicate with the base station over multiple subcarriers in accordance with the second message, where one or more subcarriers of the multiple subcarriers carry data jointly modulated with tone reservation signals on the individual subcarrier basis.

Some examples of the method, apparatuses, and non-transitory computer-readable medium described herein may further include operations, features, means, or instructions for receiving, from the base station, control signaling indicating one or more search metrics, the one or more search metrics including a channel energy threshold, a channel capacity threshold, a channel covariance matrix condition number threshold, a channel covariance matrix determinant threshold, a channel covariance matrix eigenvalue summation threshold, a channel covariance matrix eigenvalue threshold, or any combination thereof, receiving, from the base station, one or more demodulation reference signals (DMRSs), and identifying the one or more subcarriers of the multiple subcarriers based on the one or more search metrics and the one or more DMRSs.

Some examples of the method, apparatuses, and non-transitory computer-readable medium described herein may further include operations, features, means, or instructions for receiving, from the base station, control signaling indicating a quantity of subcarriers to be used for joint modulation of data with tone reservation signals, one or more search metrics associated with the quantity of subcarriers, a quantity of spatial layers to be used for joint modulation of data with tone reservation signals, a precoding scheme to be used for joint modulation of data with tone reservation signals, or any combination thereof, where communicating with the base station over the multiple subcarriers may be based on the control signaling.

In some examples of the method, apparatuses, and non-transitory computer-readable medium described herein, the precoding scheme includes a singular value decomposition (SVD) precoding scheme.

In some examples of the method, apparatuses, and non-transitory computer-readable medium described herein, the quantity of subcarriers to be used for joint modulation of data with tone reservation signals may be indicated as a percentage of the multiple subcarriers.

Some examples of the method, apparatuses, and non-transitory computer-readable medium described herein may further include operations, features, means, or instructions for performing joint modulation of data with tone reservation signals in accordance with one or both of a diagonalization precoding scheme or the precoding scheme indicated by the control signaling.

In some examples of the method, apparatuses, and non-transitory computer-readable medium described herein, the control signaling includes a radio resource control (RRC) message, a medium access control (MAC)-control element (CE), an instance of downlink control information (DCI), or any combination thereof.

Some examples of the method, apparatuses, and non-transitory computer-readable medium described herein may further include operations, features, means, or instructions for identifying a first set of spatial layers corresponding to a first set of channel eigenvalues and a second set of spatial layers corresponding to a second set of channel eigenvalues, where the first set of channel eigenvalues may be below a threshold and the second set of channel eigenvalues may be above the threshold, allocating the first set of spatial layers for the data jointly modulated with the tone reservation signals based on the first set of channel eigenvalues being below the threshold, and allocating the second set of spatial layers for data modulated without tone reservation signals based on the second set of channel eigenvalues being above the threshold.

In some examples of the method, apparatuses, and non-transitory computer-readable medium described herein, communicating with the base station over the multiple subcarriers may include operations, features, means, or instructions for communicating the data jointly modulated with the tone reservation signals via the first set of spatial layers.

Some examples of the method, apparatuses, and non-transitory computer-readable medium described herein may further include operations, features, means, or instructions for receiving an indication of a channel eigenvalue threshold from the base station, where a quantity of spatial layers to be used for joint modulation of data with tone reservation signals may be based on the channel eigenvalue threshold.

Some examples of the method, apparatuses, and non-transitory computer-readable medium described herein may further include operations, features, means, or instructions for mapping each of the tone reservation signals to a defined symbol location of a constellation map used for data modulation in accordance with a hard slicing procedure.

In some examples of the method, apparatuses, and non-transitory computer-readable medium described herein, the first message indicates a capability of the UE to support joint modulation of data with tone reservation signals in accordance with the hard slicing procedure.

In some examples of the method, apparatuses, and non-transitory computer-readable medium described herein, the second message activates joint modulation of data with tone reservation signals in accordance with the hard slicing procedure.

A method for wireless communications at a base station is described. The method may include receiving, from a UE, a first message indicating a capability of the UE to jointly modulate data with tone reservation signals on an individual subcarrier basis, transmitting, based on the first message, a second message activating joint modulation of data with tone reservation signals for the UE, and communicating with the UE over multiple subcarriers in accordance with the second message, where one or more subcarriers of the multiple subcarriers carry data jointly modulated with tone reservation signals on the individual subcarrier basis.

An apparatus for wireless communications at a base station is described. The apparatus may include a processor, memory coupled with the processor, and instructions stored in the memory. The instructions may be executable by the processor to cause the apparatus to receive, from a UE, a first message indicating a capability of the UE to jointly modulate data with tone reservation signals on an individual subcarrier basis, transmit, based on the first message, a second message activating joint modulation of data with tone reservation signals for the UE, and communicate with the UE over multiple subcarriers in accordance with the second message, where one or more subcarriers of the multiple subcarriers carry data jointly modulated with tone reservation signals on the individual subcarrier basis.

Another apparatus for wireless communications at a base station is described. The apparatus may include means for receiving, from a UE, a first message indicating a capability of the UE to jointly modulate data with tone reservation signals on an individual subcarrier basis, means for transmitting, based on the first message, a second message activating joint modulation of data with tone reservation signals for the UE, and means for communicating with the UE over multiple subcarriers in accordance with the second message, where one or more subcarriers of the multiple subcarriers carry data jointly modulated with tone reservation signals on the individual subcarrier basis.

A non-transitory computer-readable medium storing code for wireless communications at a base station is described. The code may include instructions executable by a processor to receive, from a UE, a first message indicating a capability of the UE to jointly modulate data with tone reservation signals on an individual subcarrier basis, transmit, based on the first message, a second message activating joint modulation of data with tone reservation signals for the UE, and communicate with the UE over multiple subcarriers in accordance with the second message, where one or more subcarriers of the multiple subcarriers carry data jointly modulated with tone reservation signals on the individual subcarrier basis.

Some examples of the method, apparatuses, and non-transitory computer-readable medium described herein may further include operations, features, means, or instructions for receiving, from the UE, one or more sounding reference signals (SRSs) and determining a downlink channel estimate, a quantity of spatial layers to be used for joint modulation of data with tone reservation signals, a quantity of subcarriers to be used for joint modulation of data with tone reservation signals, a channel eigenvalue threshold associated with the quantity of subcarriers, or any combination thereof based on the one or more SRSs.

Some examples of the method, apparatuses, and non-transitory computer-readable medium described herein may further include operations, features, means, or instructions for transmitting control signaling indicating whether joint modulation of data with tone reservation signals may be activated for the UE, a quantity of subcarriers to be used for joint modulation of data with tone reservation signals, one or more search metrics associated with the quantity of subcarriers to be used for joint modulation of data with tone reservation signals, a precoding scheme to be used for joint modulation of data with tone reservation signals, or any combination thereof, where communicating with the UE over the multiple subcarriers may be based on the control signaling.

In some examples of the method, apparatuses, and non-transitory computer-readable medium described herein, the one or more search metrics include a channel energy threshold, a channel capacity threshold, a channel covariance matrix condition number threshold, a channel covariance matrix determinant threshold, a channel covariance matrix eigenvalue summation threshold, a channel covariance matrix eigenvalue threshold, or any combination thereof.

In some examples of the method, apparatuses, and non-transitory computer-readable medium described herein, the precoding scheme includes an SVD precoding scheme.

In some examples of the method, apparatuses, and non-transitory computer-readable medium described herein, the quantity of subcarriers to be used for joint modulation of data with tone reservation signals may be indicated as a percentage of the multiple subcarriers.

In some examples of the method, apparatuses, and non-transitory computer-readable medium described herein, the control signaling includes an RRC message, a MAC-CE, an instance of DCI, or any combination thereof.

Some examples of the method, apparatuses, and non-transitory computer-readable medium described herein may further include operations, features, means, or instructions for identifying a first set of spatial layers corresponding to a first set of channel eigenvalues and a second set of spatial layers corresponding to a second set of channel eigenvalues, where the first set of channel eigenvalues may be below a threshold and the second set of channel eigenvalues may be above the threshold, allocating the first set of spatial layers for the data jointly modulated with the tone reservation signals based on the first set of channel eigenvalues being below the threshold, and allocating the second set of spatial layers for data modulated without tone reservation signals based on the second set of channel eigenvalues being above the threshold.

In some examples of the method, apparatuses, and non-transitory computer-readable medium described herein, communicating with the UE over the multiple subcarriers may include operations, features, means, or instructions for communicating the data jointly modulated with the tone reservation signals via the first set of spatial layers.

Some examples of the method, apparatuses, and non-transitory computer-readable medium described herein may further include operations, features, means, or instructions for transmitting an indication of a channel eigenvalue threshold, where a quantity of spatial layers to be used for joint modulation of data with tone reservation signals may be based on the channel eigenvalue threshold.

In some examples of the method, apparatuses, and non-transitory computer-readable medium described herein, a code rate to be used for joint modulation of data with tone reservation signals or a transfer block size to be used for joint modulation of data with tone reservation signals may be based on a quantity of spatial layers to be used for joint modulation of data with tone reservation signals.

Some examples of the method, apparatuses, and non-transitory computer-readable medium described herein may further include operations, features, means, or instructions for transmitting control signaling indicating a dynamic rank percentage to be used for joint modulation of data with tone reservation signals, where communicating with the UE over the multiple subcarriers may be based on the control signaling.

Some examples of the method, apparatuses, and non-transitory computer-readable medium described herein may further include operations, features, means, or instructions for mapping each of the tone reservation signals to a defined symbol location of a constellation map used for data modulation in accordance with a hard slicing procedure.

In some examples of the method, apparatuses, and non-transitory computer-readable medium described herein, the first message indicates a capability of the UE to support joint modulation of data with tone reservation signals in accordance with the hard slicing procedure.

In some examples of the method, apparatuses, and non-transitory computer-readable medium described herein, the second message activates joint modulation of data with tone reservation signals in accordance with the hard slicing procedure.

DETAILED DESCRIPTION

Figure 1:
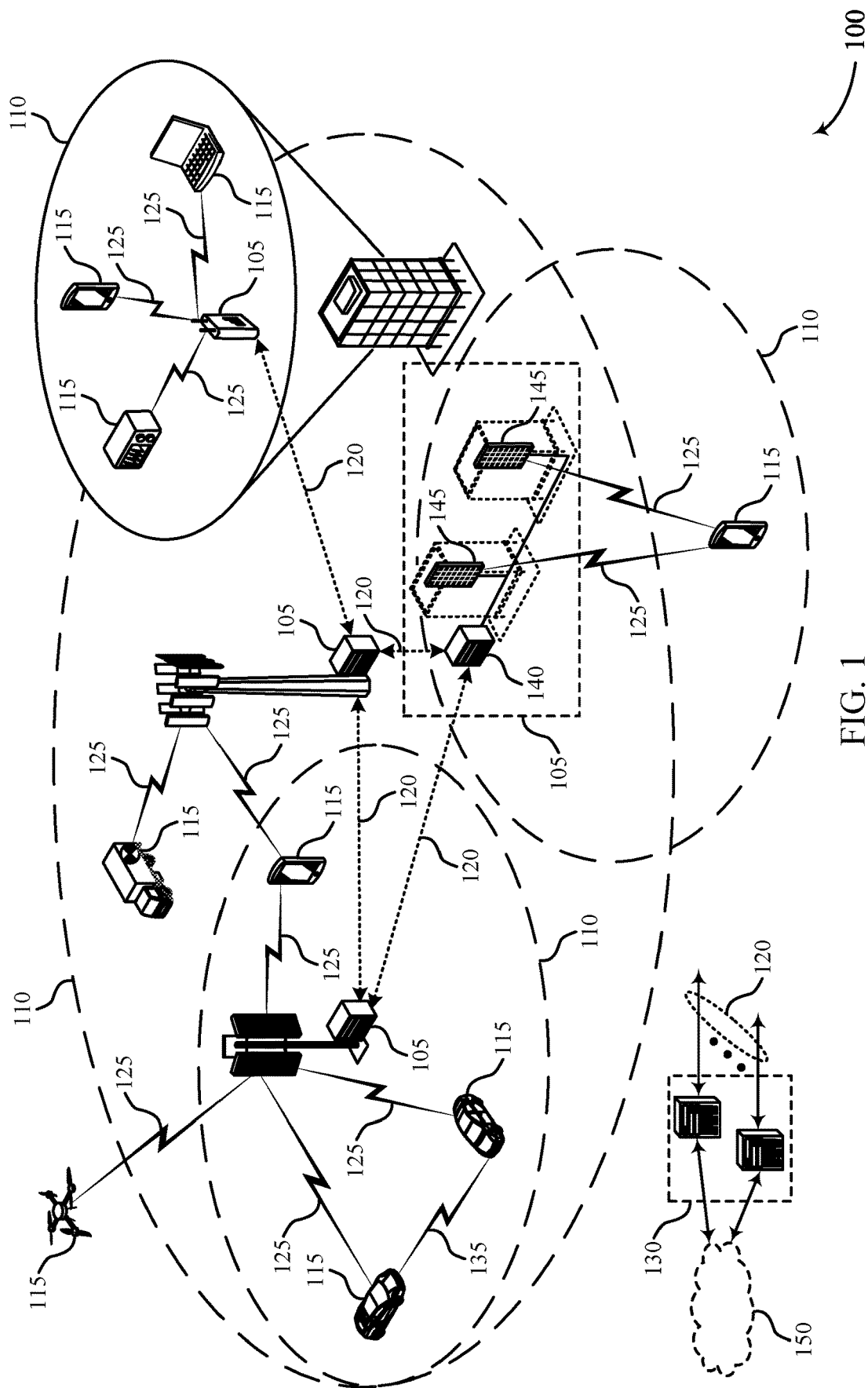
FIG. 1 illustrates an example of a wireless communications system that supports techniques for joint modulation of data with tone reservation signals in accordance with aspects of the present disclosure.

In some wireless communications systems, power amplifiers (PAs) of devices operating in higher frequency ranges (e.g., millimeter wave (mmW) frequency ranges) may consume a large amount of power. One approach to reducing the power consumption of a PA is to reduce the peak to average power ratio (PAPR) of waveforms amplified by the PA. Decreasing PAPR may reduce the input voltage to the PA, thereby enabling the PA to operate with greater power efficiency. One method for reducing PAPR involves projecting time-domain signal peaks of a waveform onto reserved subcarriers with an inverse sign. These time-domain signal peaks, otherwise known as tone reservation signals, may constructively combine with what is transmitted on other subcarriers of the waveform to reduce the PAPR of the waveform.

However, conventional tone reservation techniques may result in decreased throughput. For example, projecting tone reservation signals onto reserved subcarriers may reduce a number of subcarriers available for data modulation. In some cases, a device may use channel aware tone reservation to dynamically determine which subcarriers to use for tone reservation signals. For example, the device may allocate subcarriers with lower channel capacity to tone reservation signals, and may allocate subcarriers with higher channel capacity to data. Using channel aware tone reservation techniques may improve throughput levels (e.g., in comparison to other tone reservation schemes). However, existing channel aware tone reservation techniques may result in poor spectral efficiency because fewer subcarriers can be used for data modulation.

Aspects of the present disclosure provide for modulating data and tone reservation signals on the same subcarrier. For example, data and tone reservation signals may be jointly modulated on one subcarrier (e.g., rather than allocating some subcarriers to data and other subcarriers to tone reservation signals). In some examples, a user equipment (UE) may transmit a first message indicating a capability of the UE to jointly modulate data with tone reservation signals on an individual subcarrier basis. In turn, the UE may receive a second message from a base station that activates joint modulation of data with tone reservation signals. Accordingly, the UE may communicate with the base station over multiple subcarriers, where some of the subcarriers carry data jointly modulated with tone reservation signals, and other subcarriers carry data modulated without tone reservation signals.

The techniques described herein may reduce the overhead associated with tone reservation, and may provide improved PAPR gains (e.g., lower overall PAPR). The described techniques may also provide for using hard slicing to map tone reservation signals onto defined locations of a constellation map. The hard sliced tone reservation signals can be modulated with data on the same subcarrier, thereby providing greater spectral efficiency and lower overall PAPR. The techniques described herein can also be used without a singular value decomposition (SVD) precoding scheme, which may result in greater transmission robustness.

Aspects of the disclosure are initially described in the context of wireless communications systems, tone reservation procedures, block diagrams, and process flows. Aspects of the disclosure are further illustrated by and described with reference to apparatus diagrams, system diagrams, and flowcharts that relate to techniques for joint modulation of data with tone reservation signals.

FIG. 1 illustrates an example of a wireless communications system 100 that supports techniques for joint modulation of data with tone reservation signals in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency (RF) spectrum resources having a defined physical layer structure for supporting the communication links 125. For example, a carrier used for a communication link 125 may include a portion of an RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the RF spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a RE may consist of one symbol period (e.g., a duration of one modulation symbol) and one subcarrier, where the symbol period and subcarrier spacing (SCS) are inversely related. The number of bits carried by each RE may depend on the modulation scheme (e.g., the order of the modulation scheme, the coding rate of the modulation scheme, or both). Thus, the more REs that a UE 115 receives and the higher the order of the modulation scheme, the higher the data rate may be for the UE 115. A wireless communications resource may refer to a combination of an RF spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include an SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time-domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time-domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs))

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In mmW (e.g., FR2) and sub-THz (e.g., FR4 and beyond) frequency bands, bandwidth sizes may increase to above 1 GHZ, which may enable larger SCSs (e.g., up to 1 MHZ) and linear decreases in slot latency. In these frequency bands, RF power consumption may be relatively high. For example, a PA of a base station 105 may consume thousands of Watts while operating in these frequency bands.

One approach to reduce PA power consumption is to reduce the PAPR of transmitted waveforms, which may reduce an input voltage of the PA, increase an output power of the PA, or improve overall coverage of the PA, among other examples. One method for reducing the PAPR involves tone reservation, where time-domain signal peaks of a transmitted waveform are projected into reserved subcarriers with an inverse sign. However, this method occupies a relatively large number of subcarriers, which may linearly decrease achievable throughput. To reduce the impact of tone reservation on throughput levels, channel aware tone reservation may be used. In channel aware tone reservation schemes, tone reservation subcarrier locations (e.g., indices of subcarriers allocated for tone reservations signals) may be determined dynamically based on which subcarriers have the lowest channel capacity. Other approaches utilize an existing power difference between spatial layers associated with a subcarrier (e.g., based on a channel eigenvalue distribution) for purposes of tone reservation.

Aspects of the present disclosure provide for modulating both data (e.g., using spatial layers with high channel eigenvalues) and tone reservation signals (e.g., using spatial layers with low channel eigenvalues) on the same RE. Modulating data and tone reservation signals on the same RE may reduce tone reservation overhead and decrease the PAPR of transmitted waveforms. The techniques described herein may also provide for hard slicing tone reservation symbols. Hard slicing refers to mapping a tone reservation symbol to a defined modulation constellation, such as a modulation constellation used to modulate data. Using this technique, both data and hard sliced tone reservation symbols may be modulated into the same RE. Jointly modulating data with hard sliced tone reservations signals may enable devices to use machine learning approaches, and may also improve receiver performance while maintaining low PAPR. In addition, the described techniques may be used with or without SVD precoding, which may increase the robustness of the described techniques.

Modulating data with channel aware tone reservation signals may reduce tone reservation overhead and maintain PAPR gains for throughput enhancement. Hard slicing of channel aware tone reservation with data modulated may be used to reduce inter-layer interference, which may improve overall performance while maintaining PAPR gains for throughput enhancement. In addition, a base station 105 may perform joint modulation of data (e.g., downlink data) with tone reservation signals without signaling tone reservation subcarriers to a UE 115 because the UE 115 may have sufficient information related to a downlink channel over which the data is to be transmitted. That is, both the base station 105 and the UE 115 may have adequate channel state information, which may enable the base station and the UE 115 to define a joint criteria for determining selection criteria (e.g., a highest rank per subcarrier) without additional signaling overhead.

The techniques described herein may support modulating data with channel aware tone reservation signals without signaling tone reservation subcarrier locations, hard slicing channel aware tone reservation signals with data modulated with or without signaling tone reservation subcarrier locations, compressing and signaling subcarrier locations to be used for tone reservation signals jointly modulated with data, and mapping tone reservation signals to spatial layers with the lowest eigenvalues (e.g., on an individual subcarrier basis), which may provide for reduced power consumption, improved spectral efficiency, and higher attainable throughput levels.

Figure 2:
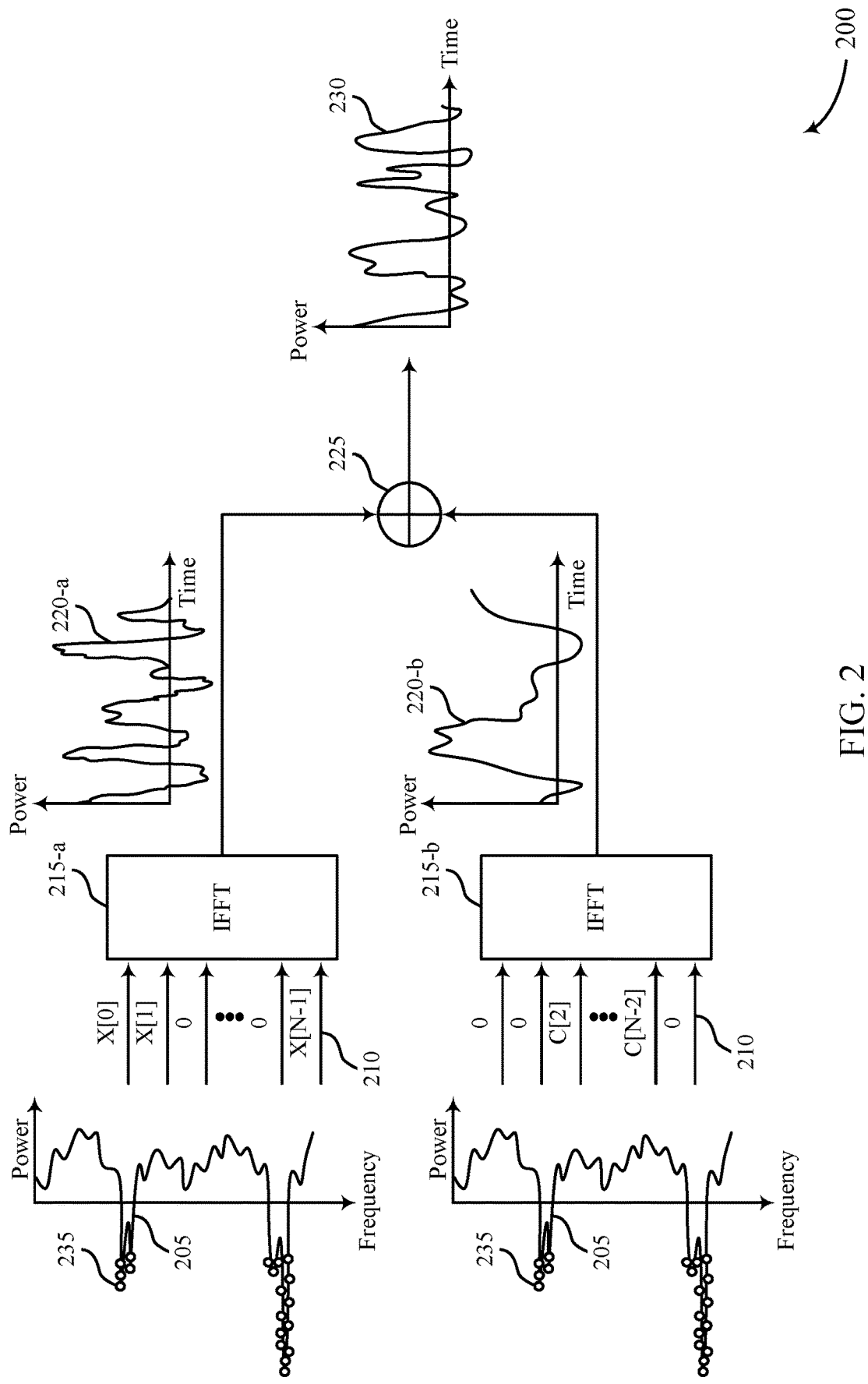
FIG. 2 illustrates an example of a tone reservation procedure that supports techniques for joint modulation of data with tone reservation signals in accordance with aspects of the present disclosure.

FIG. 2 illustrates an example of a tone reservation procedure 200 that supports techniques for joint modulation of data with tone reservation signals in accordance with aspects of the present disclosure. The tone reservation procedure 200 may implement or be implemented by aspects of the wireless communications system 100. For example, the tone reservation procedure 200 may implement or be implemented by a UE or a base station, which may be examples of corresponding devices described with reference to FIG. 1. The tone reservation procedure 200 may enable a device (e.g., a base station or a UE) to reduce the PAPR of a transmitted waveform, which may result in lower power consumption at the device.

As described herein, a transmitting device (e.g., a base station, a UE) may perform tone reservation by including a PAPR reducing signal in a set of tone reservation REs. The transmitting device may calculate the PAPR reducing signal based on a channel response (e.g., channel estimation) between the transmitting device and the receiving device. The transmitting device may determine one or more peaks associated with the channel response and the transmitting device may configure the PAPR reducing signal to cancel out or reduce an amplitude of the one or more peaks of the data signal.

For example, a base station may determine the channel response between the base station and a UE is equal to channel frequency response 205. The base station may determine n tone reservation locations 235 (e.g., REs allocated for tone reservation) from the channel frequency response 205 based on a number of tone reservations (e.g., a default number, a preconfigured number), where the n tone reservation locations 235 include the n weakest REs in a resource allocation. The base station may determine to apply a PAPR reducing signal to tone reservation locations 235. In some cases, the base station may perform a tone reservation optimization procedure to determine a PAPR reducing signal (e.g., optimal PAPR reducing signal). In some implementations, the power associated with the PAPR reducing signal (e.g., a maximum power) may not be greater than a threshold, where the threshold may be a power associated with transmitting the data (e.g., physical downlink shared channel (PDSCH) subcarrier power). In some cases, the threshold may be an average power, a lowest power, or a highest power used to transmit the data. In some cases, the power of the PAPR reducing signal may not be greater than the average power used to transmit data multiplied by a threshold.

Upon determining the PAPR reducing signal, the base station may apply the PAPR reducing signal to the tone reservation locations 235 and apply the data to the remaining REs (e.g., non-tone reservation REs). The base station may input the PAPR reducing signals of each of the tone reservation locations 235 and each data signal applied to the remaining REs (e.g., input subcarriers) into one or more inverse fast Fourier transform (IFFT) blocks 215 to determine a channel time response 230.

For example, the base station may apply the PAPR reducing signal, C (e.g., C[2], C[N−2]), to the n tone reservation locations 240 (e.g., input subcarriers, REs). The base station may apply zeros to the remaining REs (e.g., non-tone reservation REs). The base station may input the zeros and PAPR reducing signals associated with each RE in a resource allocation (e.g., input subcarriers 210) into an IFFT block 215-b. The IFFT block 215-b may convert the subcarriers to a time-domain, and thus convert channel frequency response 205 to an intermediate channel time response 220-b. Intermediate channel time response 220-b may represent the PAPR reducing signal over time.

Simultaneously (or near simultaneously) to generating intermediate channel time response 220-b, the base station may generate intermediate channel time response 220-a. The base station may apply a data signal, X, to the remaining REs (e.g., input subcarriers, non-tone reservation REs). The base station may apply zeros to the tone reservation locations 235. The base station may input the zeros and data signals associated with each RE in a resource allocation (e.g., input subcarriers 210) into an IFFT block 215-a. The IFFT block 215-a may convert the subcarriers to a time-domain, and thus convert channel frequency response 205 to an intermediate channel time response 220-a. Intermediate channel time response 220-a may represent the data signal over time without reduced PAPR.

To reduce PAPR of the intermediate channel time response 220-a, the base station may sum (e.g., direct sum, linear sum) intermediate channel time response 220-a and intermediate channel time response 220-b via summation block 225. The output of summation block 225 may be channel time response 230 with a reduce PAPR compared to intermediate channel time response 220-a. In some cases, IFFT block 215-a and IFFT block 215-b may be represented as a single IFFT block.

In some cases, a base station may perform an optimization procedure to further reduce the PAPR of a downlink transmission while maintaining a threshold throughput. For example, the base station may determine whether a downlink transmission including the data and PAPR reducing signal in the tone reservation locations 235 will meet a PAPR threshold. For example, the base station may be configured with or otherwise determine a PAPR threshold. If the downlink transmission (e.g., channel time response 230) has a PAPR that is less than or equal to the PAPR threshold, then the base station determined the appropriate number of tone reservation locations 235 and an appropriate PAPR reducing signal (e.g., C).

However, if the downlink transmission has a PAPR greater than the PAPR threshold then the base station may select additional tone reservation locations and re-optimize the PAPR reducing signal. For example, as the PAPR reducing signal is constrained by a threshold, the base station may locate additional tone reservation locations to lower the PAPR of the downlink transmission. As such, when the PAPR of the downlink transmission is determined to be greater than the PAPR threshold, the base station may have to increase the number of tone reservations to be greater than the default (e.g., configured) number, locate the additional REs up to the new number of tone reservations, apply tone reservation optimization to determine an optimized PAPR reducing signal (e.g., constrained by maximum power), and determine whether the PAPR of the downlink transmission meets the PAPR threshold. To determine whether the PAPR of the downlink transmission meets the PAPR threshold, the base station may generate a new channel time response by generating and summing new intermediate channel time responses. The base station may perform such a procedure until the downlink transmission is associated with a PAPR that is equal to or less than the PAPR threshold.

Figure 3:
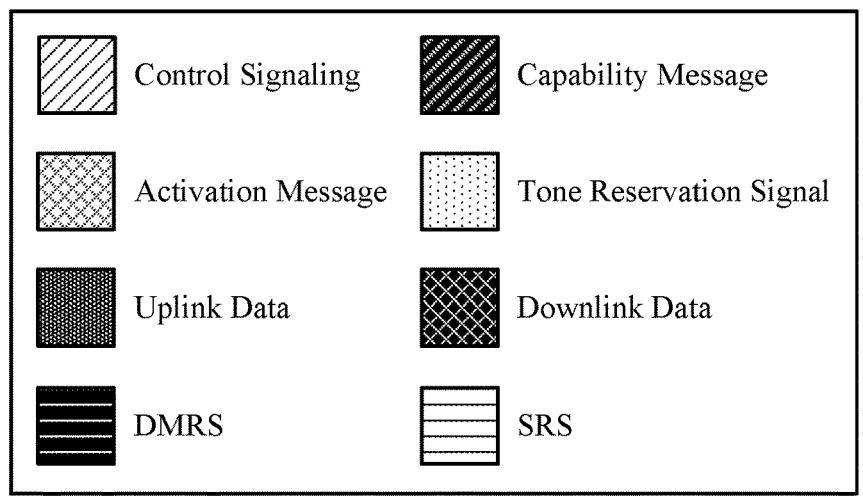
FIG. 3 illustrates an example of a wireless communications system that supports techniques for joint modulation of data with tone reservation signals in accordance with aspects of the present disclosure.
Figure 3:
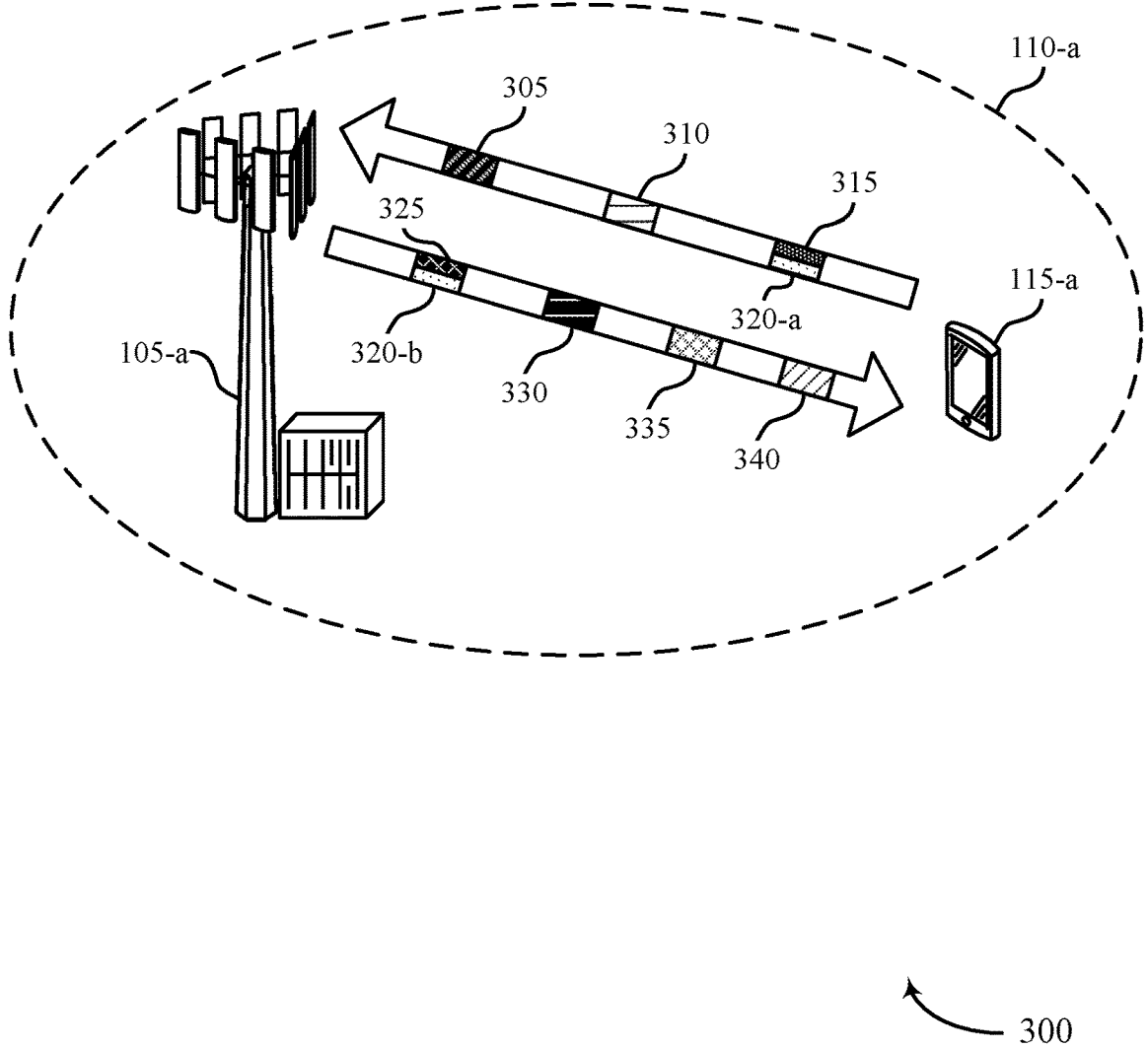

FIG. 3 illustrates an example of a wireless communications system 300 that supports techniques for joint modulation of data with tone reservation signals in accordance with aspects of the present disclosure. The wireless communications system 300 may implement or be implemented by aspects of the wireless communications system 100. For example, the wireless communications system 300 may include a base station 105-a and a UE 115-a, which may be examples of corresponding devices described with reference to FIG. 1. The base station 105-a and the UE 115-a may communicate within a geographic coverage area 110-a, which may be an example of a geographic coverage area 110 described with reference to FIG. 1. In the wireless communications system 300, the base station 105-a and the UE 115-a may perform wireless communications with reduced power consumption and higher overall throughput by jointly modulating data with tone reservation signals.

In the example of FIG. 3, the base station 105-a may transmit control signaling 340 to the UE 115-a. The control signaling 340 may indicate various parameters to be used for joint modulation of data with tone reservation signals. For example, the control signaling 340 may indicate a quantity of subcarriers to be used for joint modulation of data with tone reservation signals, a quantity of spatial layers to be used for joint modulation of data with tone reservation signals, a channel eigenvalue threshold to be used for selecting the quantity of spatial layers, a channel capacity threshold to be used for selecting the quantity of subcarriers, or a precoding scheme to be used for joint modulation of data with tone reservation signals. The control signaling 340 may include an RRC message, a MAC-control element (CE), or downlink control information (DCI), among other examples.

The control signaling 340 may also schedule one or more subsequent communications between the base station 105-a and the UE 115-a. For example, the control signaling 340 may schedule one or more uplink transmissions from the UE 115-a or one or more downlink transmissions to the UE 115-a. In some examples, the base station 105-a may schedule these transmissions over multiple subcarriers. Additionally or alternatively, the control signaling 340 may schedule one or more demodulation reference signal (DMRS) transmissions (e.g., from the base station 105-a to the UE 115-a) or sounding reference signal (SRS) transmissions (e.g., from the UE 115-a to the base station 105-a).

The UE 115-a may transmit a capability message 305 (e.g., a first message) to the base station 105-a. The capability message 305 may indicate a capability of the UE 115-a to perform joint modulation of data with tone reservation signals on an individual subcarrier basis. The capability message 305 may also indicate a capability of the UE 115-a to use hard slicing for joint modulation of data with tone reservation signals, as described with reference to FIG. 4. The base station 105-a may transmit an activation message 335 to the UE 115-a based on the capability message 305. The activation message 335 may activate joint modulation of data with tone reservation signals for the UE 115-a. If the UE 115-a is capable of using hard slicing for joint modulation of data with tone reservation signals, the activation message 335 may also configure the UE 115-*a* to use hard slicing for joint modulation of data with tone reservation signals.

In some examples, the base station 105-*a* may transmit a DMRS 330 to the UE 115-*a*. The UE 115-*a* may perform a set of measurements on the DMRS 330, and may determine various parameters to use for joint modulation of data with tone reservation signals based on the set of measurements. For example, if the UE 115-*a* receives the DMRS 330 over multiple subcarriers, the UE 115-*a* may determine that some of these subcarriers have channel capacities below a threshold (e.g., a channel capacity threshold indicated by the control signaling 340). Similarly, if the UE 115-*a* receives the DMRS 330 over multiple spatial layers, the UE 115-*a* may determine that some of these spatial layers are associated with eigenvalues below a threshold (e.g., a channel eigenvalue threshold indicated by the control signaling 340).

Additionally or alternatively, the UE 115-*a* may transmit an SRS 310 to the base station 105-*a*. The base station 105-*a* may perform a set of measurements on the SRS 310, and may determine various parameters to use for joint modulation of data with tone reservation signals based on the set of measurements. For example, the base station 105-*a* may determine a suitable quantity of spatial layers per subcarrier, a suitable quantity of subcarriers to use for joint modulation of data with tone reservation signals, channel eigenvalue thresholds (e.g., for selecting spatial layers), or channel capacity thresholds (e.g., for selecting subcarriers) based on the set of measurements. In some examples, the base station 105-*a* may determine these parameters based on an assumption of channel reciprocity between an uplink channel (e.g., on which the base station 105-*a* received the SRS 310) and a downlink channel (e.g., on which the base station transmitted the DMRS 330).

Accordingly, the base station 105-*a* and the UE 115-*a* may perform wireless communications by jointly modulating data with tone reservation signals. For example, the UE 115-*a* may transmit (e.g., to the base station 105-*a*) uplink data 315 modulated with tone reservation signals 320-*a*, and the base station 105-*a* may transmit (e.g., to the UE 115-*a*) downlink data 325 modulated with tone reservation signals 320-*b*. By jointly modulating the uplink data 315 with the tone reservation signals 320-*a*, the UE 115-*a* (e.g., a PA of the UE 115-*a*) may experience reduced power consumption. In addition, jointly modulating the uplink data 315 with the tone reservation signals 320-*a* may enable the UE 115-*a* to transmit the uplink data 315 over more subcarriers. As a result, the UE 115-*a* may be capable of attaining higher throughput levels. Likewise, jointly modulating the downlink data 325 with the tone reservation signals 320-*b* may enable the base station 105-*a* to experience lower power consumption and higher throughput levels, among other benefits.

The wireless communications system 300 may also support techniques for hard slicing tone reservation signals and jointly modulating hard sliced tone reservation signals with data (e.g., uplink data or downlink data). For example, the base station 105-*a* may hard slice tone reservation signals by mapping each tone reservation signal to a defined symbol location on a constellation map. Accordingly, the base station 105-*a* may modulate these hard sliced tone reservation signals with data prior to transmission. Hard slicing the tone reservation signals may improve the likelihood of the UE 115-*a* successfully receiving and decoding the hard sliced tone reservation signals jointly modulated with the data. More specifically, hard slicing the tone reservation signals may enable the UE 115-*a* to use a machine learning approach to demodulate and decode the tone reservation signals as well as the data, which may improve the reliability and accuracy of decoding operations performed by the UE 115-*a*.

Figure 4:
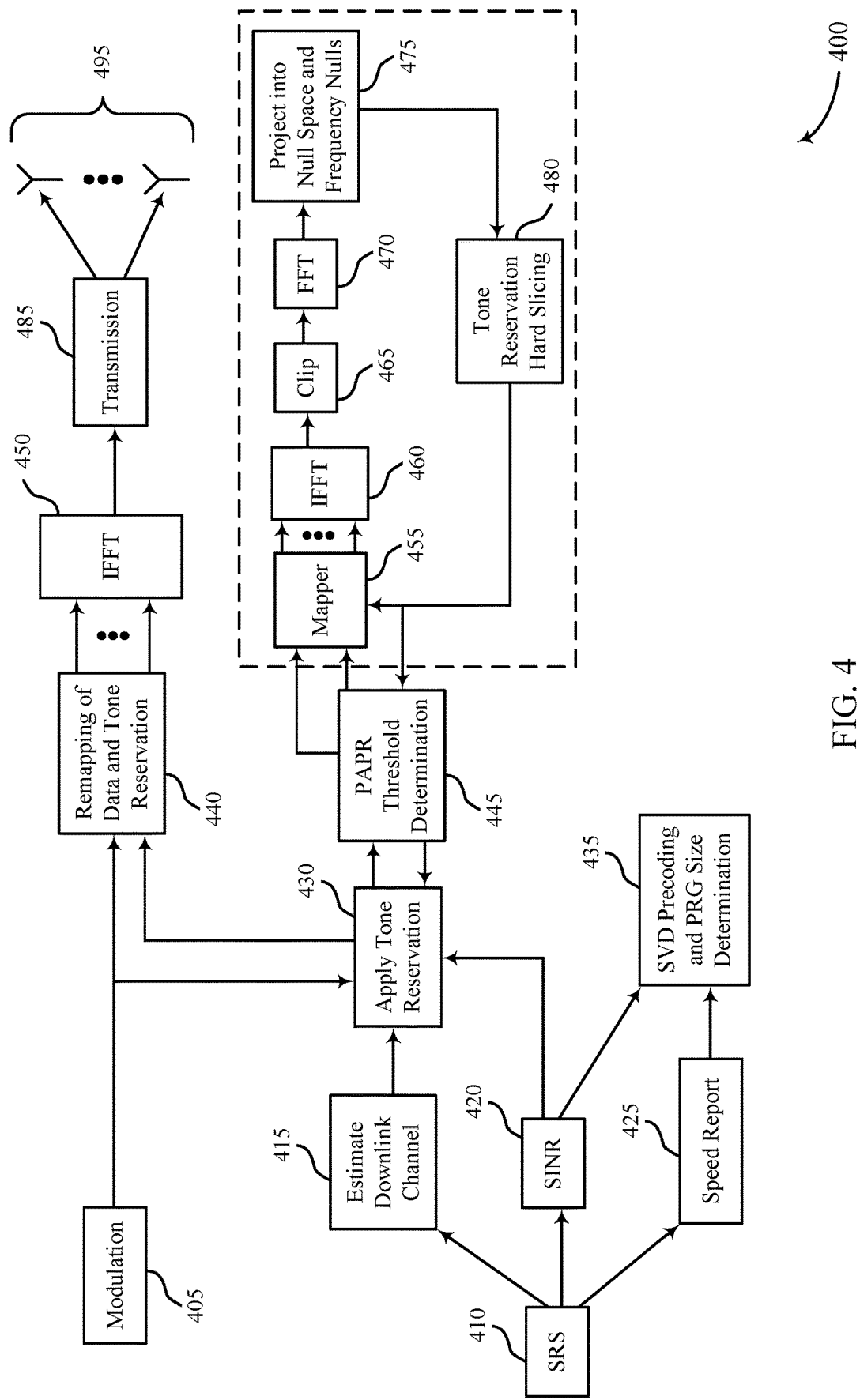
FIGS. 4 and 5 illustrate examples of block diagrams that support techniques for joint modulation of data with tone reservation signals in accordance with aspects of the present disclosure.

FIG. 4 illustrates an example of a block diagram 400 that supports techniques for joint modulation of data with tone reservation signals in accordance with aspects of the present disclosure. The block diagram 400 may implement or be implemented by aspects of the wireless communications system 100 or the wireless communications system 300. For example, the block diagram 400 may implement or be implemented by a UE or a base station, which may be examples of corresponding devices described with reference to FIGS. 1 and 3. The block diagram 400 may illustrate a transmitter design that supports modulating hard sliced tone reservation signals with data symbols in accordance with aspects of the present disclosure.

As described with reference to FIG. 3, a UE may send an indication to a base station of a capability of the UE to support modulation of hard sliced tone reservation signals with data on a same SC. In some examples, the UE may report a capability of a certain release that has the tone reservation signals. For downlink transmissions, the UE may receive an indication that joint modulation of hard sliced tone reservation signals with data is activated. The UE may also receive control signaling indicating a number of subcarriers used for the jointly modulated tone reservation signals, which may be indicated as a number of subcarriers relative to a downlink resource allocation (e.g., a percentage of the subcarriers in the downlink resource allocation).

The control signaling may also indicate location search metrics to use for identifying tone reservation subcarriers or a number of layers mapped for tone reservation signals. The number of layers may be indicated as a constant value or a dynamic value. For dynamic indications of tone reservation layers, the base station can signal a method for identifying the number of layers. For example, the base station may indicate an eigenvalue threshold below which the UE may define a layer as a tone reservation layer and above which the UE may define a layer as a data layer. The base station may also signal whether SVD precoding is to be used. If SVD precoding is activated, the UE may use additional diagonalization precoding to reduce inter-layer interference (e.g., using phase shifters or digital processing). This signaling may include an RRC message, a DCI message, or a MAC-CE message.

The UE may estimate an equivalent downlink channel response (e.g., after precoding, diagonalization, and equalization) and locations (e.g., indices) of subcarriers with the smallest energy, channel capacity, channel covariance matrix condition number, channel covariance matrix determinant, channel covariance matrix eigenvalue summation, or channel covariance matrix minimal eigenvalue, among other examples. These estimations may be based on DMRSs received from the base station, as described with reference to FIG. 3.

Upon estimating this criteria, the UE can estimate modulated tone reservation subcarriers by selecting subcarriers with the lowest criteria value. The UE may estimate the number of layers to allocate for tone reservation signals according to a number of eigenvalues smaller than a threshold (e.g., on an individual subcarrier basis). Alternatively, the base station may signal a quantity of layers to use for tone reservation signals. Accordingly, the UE may demodulate REs that include tone reservation subcarriers without discarding channel columns or received samples related to the tone reservation layers. After demodulation, the UE may discard hard sliced tone reservation symbols, and may continue decoding remaining subcarriers in the downlink resource allocation.

For uplink transmissions, the base station may receive SRSs from the UE and estimate a downlink channel between the UE and the base station based on a channel reciprocity assumption. The base station may determine whether to apply hard slicing tone reservation based on a signal to interference and noise ratio (SINR) of the UE and a Doppler spread report from the UE. For hard slicing tone reservation signals, the constellation to be sliced may be reported to the UE. This constellation may be identical to a data constellation or different according to PAPR (e.g., using large constellations) and performance improvement (e.g., using small constellations). The base station may also determine whether to apply SVD precoding for mitigation of inter-layer interference based on a number of resource blocks (RBs) in a precoding RB group (PRG), the doppler spread report from the UE, and the SINR of the UE.

The base station may determine a number of layers (e.g., spatial layers) to use for tone reservation signals per subcarrier, a number of subcarriers to be used for modulated tone reservation signals, or thresholds to be used for selecting spatial layers. This may be done iteratively by changing thresholds, testing whether a signal passes a CRC or not, and adding noise according to a reported SINR of the UE. In some examples, this may be done using machine learning, constraint or unconstraint schemes, testing hypothesis iterations, or predefined look up tables, among other schemes. The base station may also identify suitable location metrics for performance improvement, which may include a minimal channel energy, channel capacity, channel covariance matrix condition number, channel covariance matrix determinant, channel covariance matrix eigenvalue summation, or channel covariance matrix minimal eigenvalue, among other examples.

Accordingly, the base station may generate a UE report that includes an indication of whether to use hard slicing for joint modulation of data and tone reservation signals, an indication of whether SVD precoding is to be used or not, a number of subcarriers to be used for jointly modulated tone reservation signals (e.g., which may be indicated as a percentage of a total number of subcarriers in a resource allocation), or a selection scheme for identifying suitable subcarrier locations, among other examples. The base station may signal this information via DCI, MAC-CE or RRC messages.

The base station may then adjust a PAPR of a tone reservation signal and modulate the tone reservation signal with downlink data. The base station may update a code rate or transfer block size according to a number of spatial layers allocated for tone reservation signals. The base station may subsequently perform an OFDM transmission protocol (e.g., precoding, IFFT) with the UE report. A similar mechanism may be utilized for uplink throughput enhancement at the UE. For example, the base station may indicate (e.g., to the UE) a percentage of dynamic rank to be used by the UE for joint modulation of data with tone reservation signals.

The base station may use various metrics to determine a suitable quantity of subcarriers or a suitable quantity of spatial layers to use for joint modulation of data with tone reservation signals. These metrics may include a capacity metric, a condition number metric, a determinant metric, an eigenvalue summation metric, and a minimum eigenvalue metric. These metrics may be calculated according to Equations 1 through 5.

$$C = \log_2(\det(I_{nXn} + H_{mXn}^H R_{mm}^{-1} H_{mXn})) \equiv \log_2\left(\det\left(I_{nXn} + \underbrace{\frac{H_{mXn}^H H_{mXn}}{\sigma_N^2}}_{\text{by reported SINR}}\right)\right) \quad (1)$$

$$cond([H_{mXn} H_{mXn}^H]) = \max(eig([H_{mXn} H_{mXn}^H])) / \min(eig([H_{mXn} H_{mXn}^H])) \quad (2)$$

$$\det([H_{mXn} H_{mXn}^H])) \quad (3)$$

$$\text{sum}(eig([H_{mXn} H_{mxn}^H])) \quad (4)$$

$$\min(eig([H_{mXn} H_{mxn}^H])) \quad (5)$$

In Equations 1 through 5, C refers to a channel capacity of a specific subcarrier, n refers to a number of transmission ports or spatial layers used for transmission (e.g., assuming no receive correlation), m represents a number of receive digital streams (e.g., estimated based on SRS received from the UE), H corresponds to an uplink channel or a downlink channel between the UE and the base station, I refers to an identity matrix, R refers to an inverse matrix, and ON refers to a variable associated with a SINR reported by the UE, cond refers to a channel covariance matrix condition number, det refers to a channel covariance matrix determinant, sum refers to a channel covariance matrix eigenvalue summation, min refers to a channel covariance matrix minimum eigenvalue, and eig refers to an eigenvalue. The base station may determine location search metrics using Equations 1 through 5, and may identify suitable subcarrier locations (e.g., indices) and spatial layers for jointly modulated tone reservation signals based on these location search metrics.

In the example of FIG. 4, a base station may jointly modulate downlink data with tone reservation signals. However, it is to be understood that the block diagram 500 may also apply to a UE jointly modulating uplink data with tone reservation signals. At 410, the base station may receive an SRS from a UE. At 415, the base station may estimate a downlink channel between the UE and the base station based on the received SRS. The base station may estimate the downlink channel based on an assumption of channel reciprocity. Similarly, the base station may estimate a SINR for the UE at 420. At 425, the base station may receive a speed report from the UE. At 435, the base station may determine whether to use SVD precoding or not. The base station may also determine a suitable PRG size based on the estimated SINR for the UE and the speed report from the UE. At 430, the base station may determine whether to apply tone reservation based on the downlink channel estimate and the estimated SINR for the UE.

At 445, the base station may determine whether a PAPR threshold has been reached. If the PAPR threshold has not been reached, a default number of tones and values may be used by a mapper 455 of the base station. At 460, the base station may perform an IFFT operation on the default number of tones and values (e.g., $Z_j$). At 465, the base station may clip the resulting waveform. At 470, the base station may perform an FFT operation on the clipped waveform (e.g., $\hat{z}_j$). At 475, the base station may project the time-domain signal peaks (e.g., $e=\hat{z}-z$) into a null-space and frequency nulls. The resulting tone reservation signal (e.g., $e_{TR}=C(\hat{z}-z)$) may represent a projection to channels with the lowest capacity locations, where ' is a diagonal matrix with values of 0 and 1. At 480, the base station may perform hard slicing on the tone reservation signal. The hard sliced tone reservation signal (e.g., $HS(e_{TR})$) may be inputted to the mapper 455. The base station may determine whether the hard sliced tone reservation signal (e.g., a PAPR reduction signal output) satisfies the PAPR threshold. In some examples, the hard slicing procedure may be performed up to a threshold number (e.g., p) of iterations. Likewise, the tone reservation generation procedure may be performed up to a threshold number (e.g., k) of iterations.

If the hard sliced tone reservation signal satisfies the PAPR threshold, the base station may modulate the hard sliced tone reservation signal with the downlink data. At 405, the base station may modulate the downlink data. At 440, the base station may perform a remapping procedure of the downlink data and the hard sliced tone reservation signal. At 450, the base station may perform an IFFT operation on the modulated data and the hard sliced tone reservation signal. At 485, the base station may transmit the data jointly modulated with the hard sliced tone reservation signal. The base station may transmit the data jointly modulated with the hard sliced tone reservation signal using different antenna ports 495 (e.g., spatial layers). The block diagram 400 may support techniques for reduced power consumption, improved spectral efficiency, and higher throughput levels, among other benefits.

Figure 5:
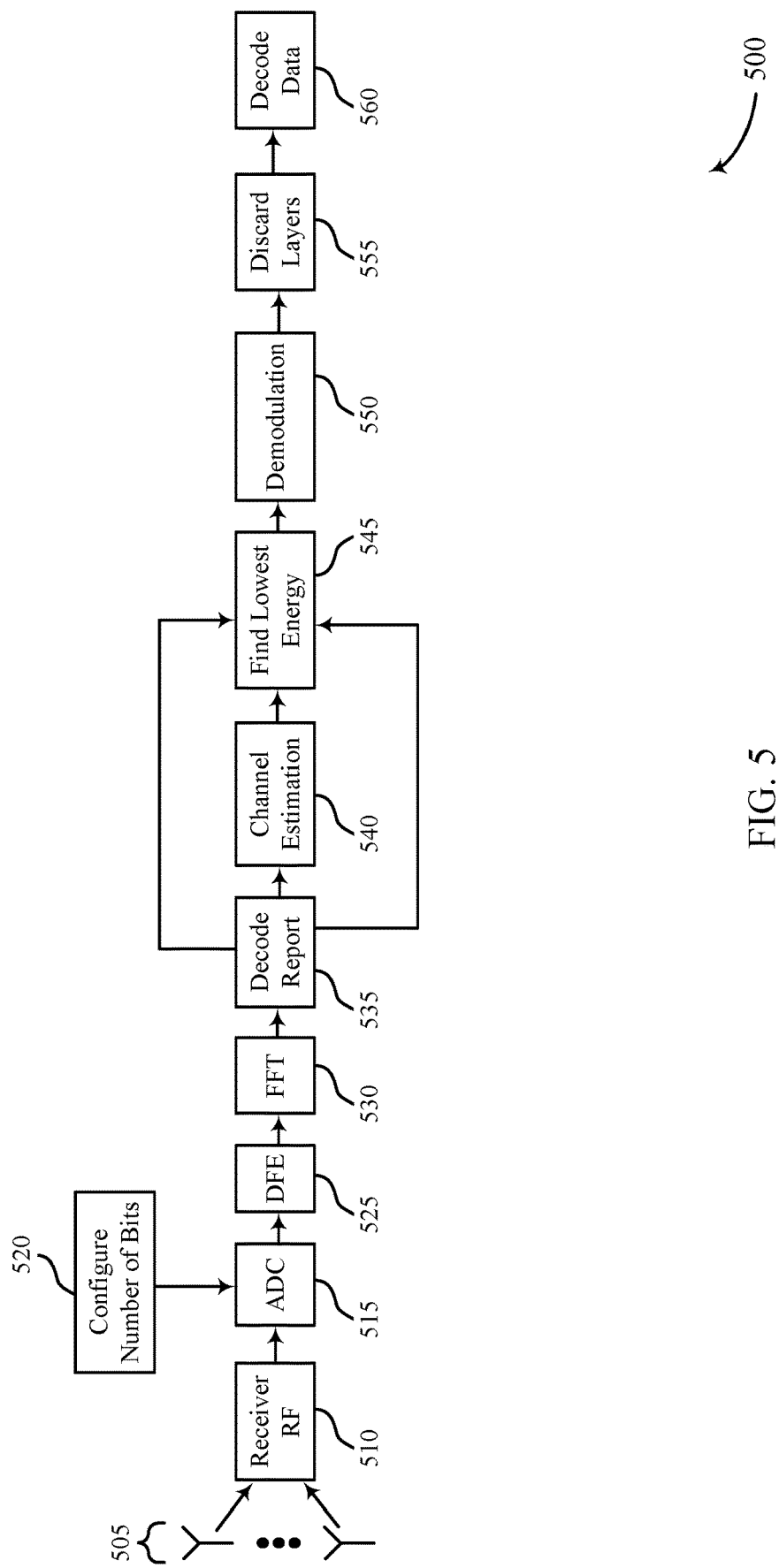

FIG. 5 illustrates an example of a block diagram 500 that supports techniques for joint modulation of data with tone reservation signals in accordance with aspects of the present disclosure. The block diagram 500 may implement or be implemented by aspects of the wireless communications system 100 or the wireless communications system 300. For example, the block diagram 400 may implement or be implemented by a UE or a base station, which may be examples of corresponding devices described with reference to FIGS. 1 and 3. The block diagram 500 may illustrate a receiver design that supports modulating hard sliced tone reservation signals with data symbols in accordance with aspects of the present disclosure.

As described with reference to FIG. 4, a UE or a base station may determine a quantity of subcarriers and a quantity of spatial layers to be used for joint modulation of data with tone reservation signals based on various criteria and thresholds. For example, a base station may define a threshold or signal a lowest number of subcarriers from a predefined criteria or metric (e.g., channel capacity) to be used for joint modulation of data and tone reservation signals. Both the UE and the base station may identify these subcarriers based on frequency-domain channel estimation criteria.

In some examples, a UE may modulate tone reservation signals with data symbols after indicating (e.g., to a base station) a capability of the UE to support joint modulation of data with tone reservation signals on an individual subcarrier basis. For downlink transmission, the UE may receive an indication (e.g., from the base station) that joint modulation of data with tone reservation signals is activated for the UE. The UE may also receive control signaling indicating a number of subcarriers to be used for the joint modulation, which may be indicated relative to a number of subcarriers allocated for data transmission (e.g., as a percentage).

The UE may also receive an indication of location search metrics to use for identifying tone reservation subcarriers or a number of layers mapped for tone reservation signals. The number of mapped layers may be constant or dynamic. If the number of mapped layers is dynamic, the base station can signal a method for the UE to use when selecting layers. For example, the base station may indicate an eigenvalue threshold below which the UE may designate a spatial layer for tone reservation signals and above which the UE may designate a spatial layer for data.

The base station may also signal (e.g., to the UE) if SVD precoding is to be used for joint modulation of data with tone reservation signals. If SVD precoding is active, the UE may use additional diagonalization precoding to reduce inter-layer interference (e.g., using phase shifters or digital processing). This signaling may include an RRC message, a DCI message, or a MAC-CE message. Accordingly, the UE may estimate an equivalent downlink channel response (e.g., after precoding, diagonalization, and equalization) along with locations of the smallest energy, channel capacity, channel covariance matrix condition number, channel covariance matrix determinant, channel covariance matrix eigenvalue summation, or channel covariance matrix minimal eigenvalue, as described with reference to FIG. 4. These estimations may be based on DMRSs received from the base station.

Upon estimating these criteria, the UE can estimate modulated tone reservation subcarriers by selecting subcarriers with the lowest criteria value along with a signaled amount of subcarriers. The UE may estimate a number of layers to use for tone reservation signals (e.g., per subcarrier) according to a number of eigenvalues below an eigenvalue threshold. Alternatively, the base station may signal the number of spatial layers to use for joint modulation of data with tone reservation signals. The UE may then discard channel columns and equivalent received samples related to the tone reservation spatial layers, and may demodulate these subcarriers in accordance with a decoding procedure. As an example, if the UE modulates one data layer with one tone reservation layer (e.g., resulting in a 2×2 channel matrix), the UE may demodulate and decode the data modulated with the tone reservation signals using equations 6 through 10.

$$\tilde{Y}_{2X1} = W^{Rx}_{2X2} H_{2X2} W^{Tx}_{2X2} s_{2X1} + W^{Rx}_{2X2} n_{2X1} \quad (6)$$

$$H = u\Omega v'; \Omega = \begin{bmatrix} \lambda_1 & 0 \\ 0 & \lambda_2 \end{bmatrix}; \lambda_1 > \lambda_2 \quad (7)$$

$$\tilde{Y}_{2X1} = W^{Rx}_{2X2} u \begin{bmatrix} \lambda_1 & 0 \\ 0 & \lambda_2 \end{bmatrix} \begin{bmatrix} s_1 \\ TR \end{bmatrix} + W^{Rx}_{2X2} n_{2X1} \quad (8)$$

$$\tilde{Y}_{2X1} = \begin{bmatrix} \lambda_1 & \epsilon_1 \\ \epsilon_2 & \lambda_2 \end{bmatrix} \begin{bmatrix} s_1 \\ TR \end{bmatrix} + \overline{u^{-1} n_{2X1}}^{n_{2X1}} \quad (9)$$

$$\tilde{Y}_{1X1} = \lambda_1 s_1 + \epsilon_1 TR + \tilde{n}_{1X1} \quad (10)$$

Equation 6 represents signals that the UE receives from the base station over a downlink channel. Equation 7 represents an SVD precoding scheme used by the base station to transmit the signals. Equation 8 represents the signals after SVD precoding. The UE may use a diagonalization scheme (e.g., $W_{2\times2}^{Rx} = u^{-1}$) to decode the signals when SVD precoding is active. Equation 9 represents the received signal after diagonalization. Equation 10 represents the received signal after the UE discards spatial layers allocated for tone reservation signals. After discarding these layers, the UE may perform additional decoding operations on the received signals.

In the example of FIG. 5, a UE may decode a downlink transmission that includes downlink data jointly modulated with tone reservation signals. However, it is to be understood that the block diagram 500 may also be applicable to uplink reception at a base station. As an example, the UE may receive signals on antenna ports 505 that correspond to different spatial layers. At 510, an RF receiver of the UE may process the received signals. At 515, an analog digital converter (ADC) of the UE may process the received signals. At 520, the UE may configure a number of bits to use for decoding the received signals. At 525, a digital front end (DFE) of the UE may process the received signals. At 530, the UE may perform a fast Fourier transform (FFT) operation on the received signals. At 535, the UE may decode a report that indicates a number of tone reservation enabled subcarriers. At 540, the UE may perform channel estimation based on receiving one or more DMRSs.

At 545, the UE may identify subcarriers with a lowest energy, channel capacity, channel covariance matrix condition number, channel covariance matrix determinant, channel covariance matrix eigenvalue summation, or channel covariance matrix eigenvalue based on the number of tone reservation enabled subcarriers indicated by the report. At 550, the UE may determine the locations (e.g., indices) of subcarriers carrying tone reservation signals, and may demodulate the received signals using a machine learning demodulation algorithm. At 555, the UE may discard demodulated layers carrying tone reservation signals. Accordingly, the UE may decode the remaining downlink data at 560.

The block diagram 500 may support techniques for reduced power consumption, higher throughput, and greater spectral efficiency, among other benefits. For example, the described techniques may enable a device (e.g., a UE or a base station) to jointly modulate data with tone reservation signals, which may increase a number of subcarriers available for data transmission. Using more subcarriers for data transmission may improve overall throughput without diminishing communication reliability. In addition, modulating data with tone reservation signals in accordance with aspects of the present disclosure may result in lower PA power consumption and greater power savings, among other benefits.

Figure 6:
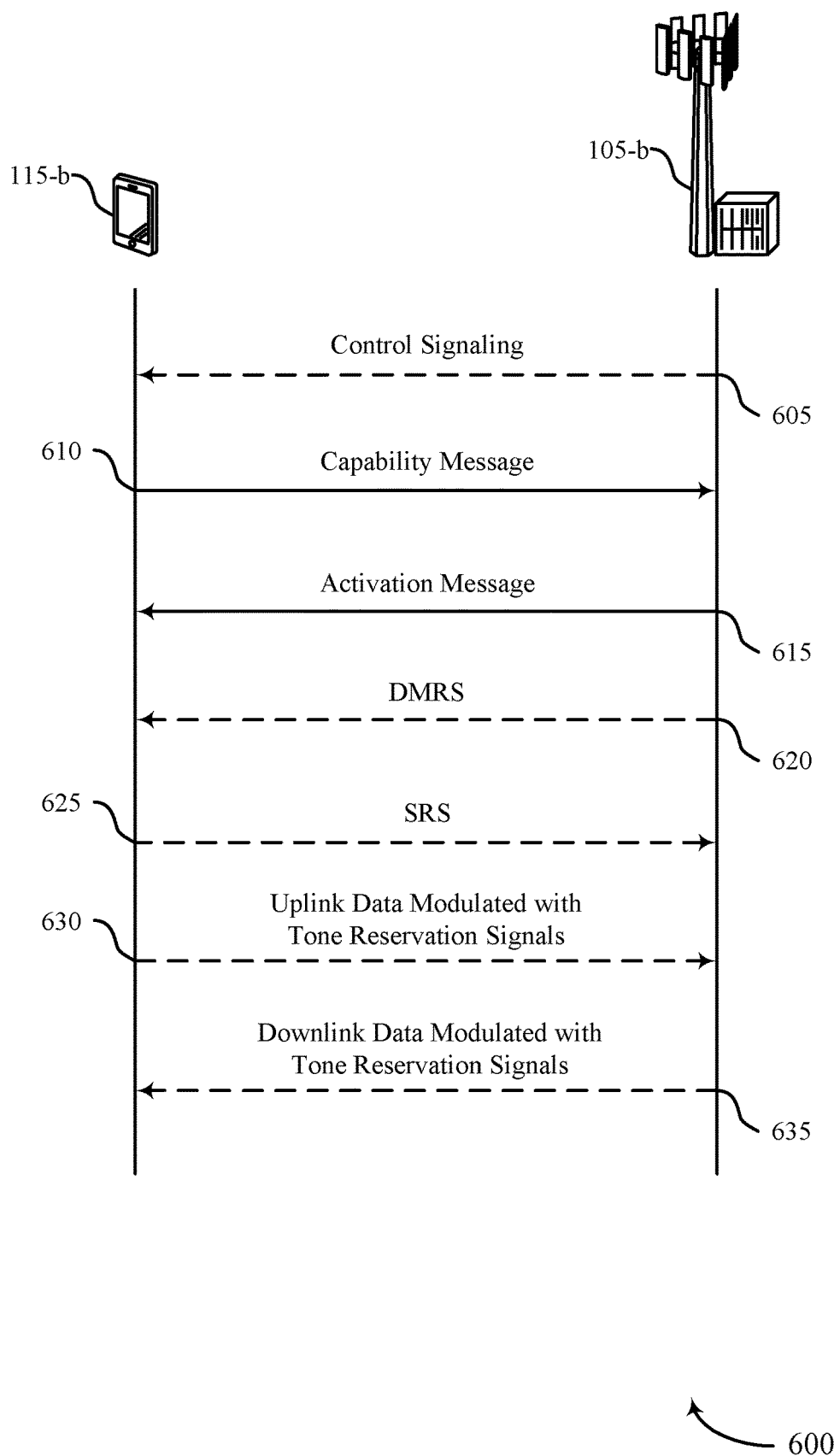
FIG. 6 illustrates an example of a process flow that supports techniques for joint modulation of data with tone reservation signals in accordance with aspects of the present disclosure.

FIG. 6 illustrates an example of a process flow 600 that supports techniques for joint modulation of data with tone reservation signals in accordance with aspects of the present disclosure. The process flow 600 may implement or be implemented by aspects of the wireless communications system 100 or the wireless communications system 300. For example, the process flow 600 may include a UE 115-*b* and a base station 105-*b*, which may be examples of corresponding devices described with reference to FIGS. 1 and 3. In the following description of the process flow 600, operations between the UE 115-*b* and the base station 105-*b* may be performed in a different order or at a different time than as shown. Additionally or alternatively, some operations may be omitted from the process flow 600, and other operations may be added to the process flow 600.

At 605, the base station 105-*b* may transmit control signaling to the UE 115-*b*. The control signaling may indicate a quantity of subcarriers to be used for joint modulation of data with tone reservation signals, one or more search metrics associated with the quantity of subcarriers, a quantity of spatial layers to be used for joint modulation of data with tone reservation signals, a precoding scheme (e.g., an SVD precoding scheme) to be used for joint modulation of data with tone reservation signals, a code rate to be used for joint modulation of data with tone reservation signals, a transfer block size to be used for joint modulation of data with tone reservation signals, a dynamic rank percentage to be used for joint modulation of data with tone reservation signals, or any combination thereof. The one or more search metrics may include a channel energy threshold, a channel capacity threshold, a channel covariance matrix condition number threshold, a channel covariance matrix determinant threshold, a channel covariance matrix eigenvalue summation threshold, a channel covariance matrix eigenvalue threshold, or any combination thereof. In some examples, the quantity of subcarriers to be used for joint modulation of data with tone reservation signals may be indicated as a percentage of a total number of subcarriers configured for data transmission. The control signaling may also indicate a channel eigenvalue threshold to be used for joint modulation of data with tone reservation signals. The control signaling may include an RRC message, a MAC-CE, or an instance of DCI, among other examples.

At 610, the UE 115-*b* may transmit a first message (e.g., a capability message) to the base station 105-*b*. The first message may indicate a capability of the UE 115-*b* to jointly modulate data with tone reservation signals on an individual subcarrier basis. Additionally or alternatively, the first message may indicate a capability of the UE 115-*b* to support hard slicing for joint modulation of data with tone reservation signals. At 615, the base station 105-*b* may transmit a second message (e.g., an activation message) to the UE 115-*b* based on receiving the first message. The second message may activate joint modulation of data with tone reservation signals for the UE 115-*b*. The second message may also activate hard slicing for joint modulation of data with tone reservation signals.

In some examples, the base station 105-*b* may transmit one or more DMRSs to the UE 115-*b* at 620. Additionally or alternatively, the UE 115-*b* may transmit one or more SRSs to the base station 105-*b* at 625. The UE 115-*b* may determine which subcarriers and spatial layers to use for joint modulation of data with tone reservation signals based on receiving the one or more DMRSs from the base station 105-*b*. More specifically, the UE 115-*b* may identify a first set of spatial layers corresponding to a first set of channel eigenvalues and a second set of spatial layers corresponding to a second set of channel eigenvalues. The first set of channel eigenvalues may be below a threshold, whereas the second set of channel eigenvalues may be above the threshold. Accordingly, the UE 115-*b* may allocate the first set of spatial layers for data that is jointly modulated with tone reservation signals, and may allocate the second set of spatial layers to data modulated without tone reservation signals. Similarly, the base station 105-*b* may determine which subcarriers and spatial layers to use for joint modulation of data with tone reservation signals based on receiving the one or more SRSs from the UE 115-*b*.

Accordingly, the UE 115-*b* may communicate with the base station 105-*b* over multiple subcarriers in accordance with the second message, where one or more of the multiple subcarriers carry data that is jointly modulated with tone reservation signals on an individual subcarrier basis. At 630, the UE 115-*b* may transmit uplink data jointly modulated with tone reservation signals on one or more subcarriers. The UE 115-*b* may perform joint modulation of the uplink data with the tone reservation signals in accordance with a diagonalization precoding scheme, an SVD precoding scheme, or both. Likewise, the base station 105-*b* may transmit downlink data jointly modulated with tone reservation signals on one or more subcarriers at 635. In some examples, the UE 115-*b* and the base station 105-*b* may use hard slicing for joint modulation of data with tone reservation signals. For example, the UE 115-*b* may map one or more tone reservation signals to one or more respective symbol locations of a constellation map that is used for data modulation.

The process flow 600 may support techniques for reduced power consumption, higher throughput, and greater spectral efficiency, among other benefits. For example, the described techniques may enable the UE 115-*b* and the base station 105-*b* to jointly modulate data with tone reservation signals, which may increase a number of subcarriers available for data transmission. Using more subcarriers for data transmission may improve overall throughput without diminishing communication reliability. In addition, modulating data with tone reservation signals in accordance with aspects of the present disclosure may reduce PA power consumption at the UE 115-*b* and the base station 105-*b*, among other benefits.

Figure 7:
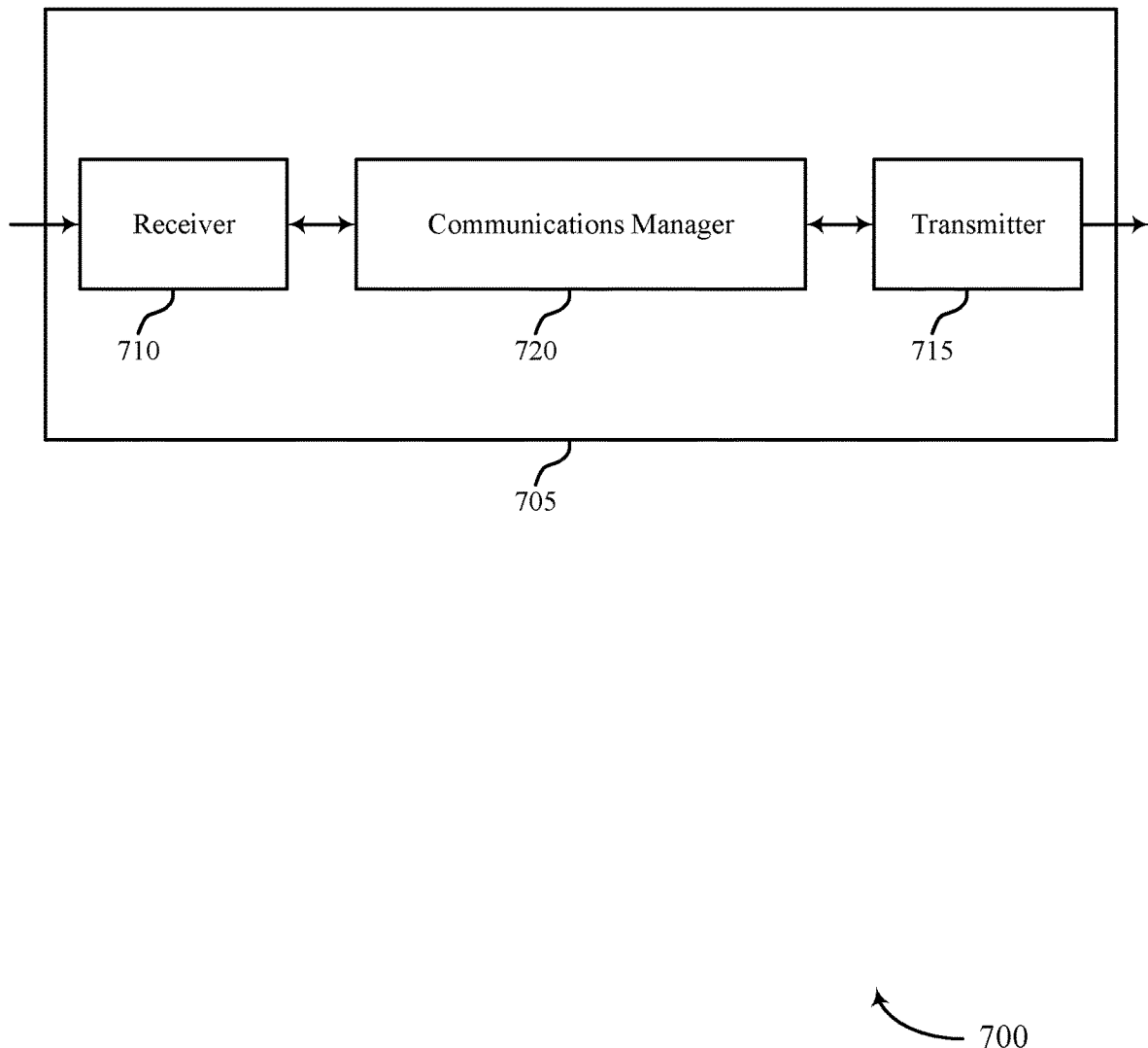
FIGS. 7 and 8 show block diagrams of devices that support techniques for joint modulation of data with tone reservation signals in accordance with aspects of the present disclosure.

FIG. 7 shows a block diagram 700 of a device 705 that supports techniques for joint modulation of data with tone reservation signals in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for joint modulation of data with tone reservation signals). Information may be passed on to other components of the device 705. The receiver 710 may utilize a single antenna or multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for joint modulation of data with tone reservation signals). In some examples, the transmitter 715 may be co-located with a receiver 710 in a transceiver module. The transmitter 715 may utilize a single antenna or multiple antennas.

The communications manager 720, the receiver 710, the transmitter 715, or various combinations thereof or various components thereof may be examples of means for performing various aspects of techniques for joint modulation of data with tone reservation signals as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at the device 705 (e.g., a UE 115) in accordance with examples as disclosed herein. For example, the communications manager 720 may be configured as or otherwise support a means for transmitting a first message indicating a capability of the device 705 to jointly modulate data with tone reservation signals on an individual subcarrier basis. The communications manager 720 may be configured as or otherwise support a means for receiving, from a base station and based on the first message, a second message activating joint modulation of data with tone reservation signals for the device 705. The communications manager 720 may be configured as or otherwise support a means for communicating with the base station over multiple subcarriers in accordance with the second message, where one or more subcarriers of the multiple subcarriers carry data jointly modulated with tone reservation signals on the individual subcarrier basis.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced power consumption based on transmitting data that is jointly modulated with tone reservation signals. Modulating data with tone reservation signals may lower the PAPR of signals transmitted by the device 705, which may reduce PA power consumption at the device 705.

Figure 8:
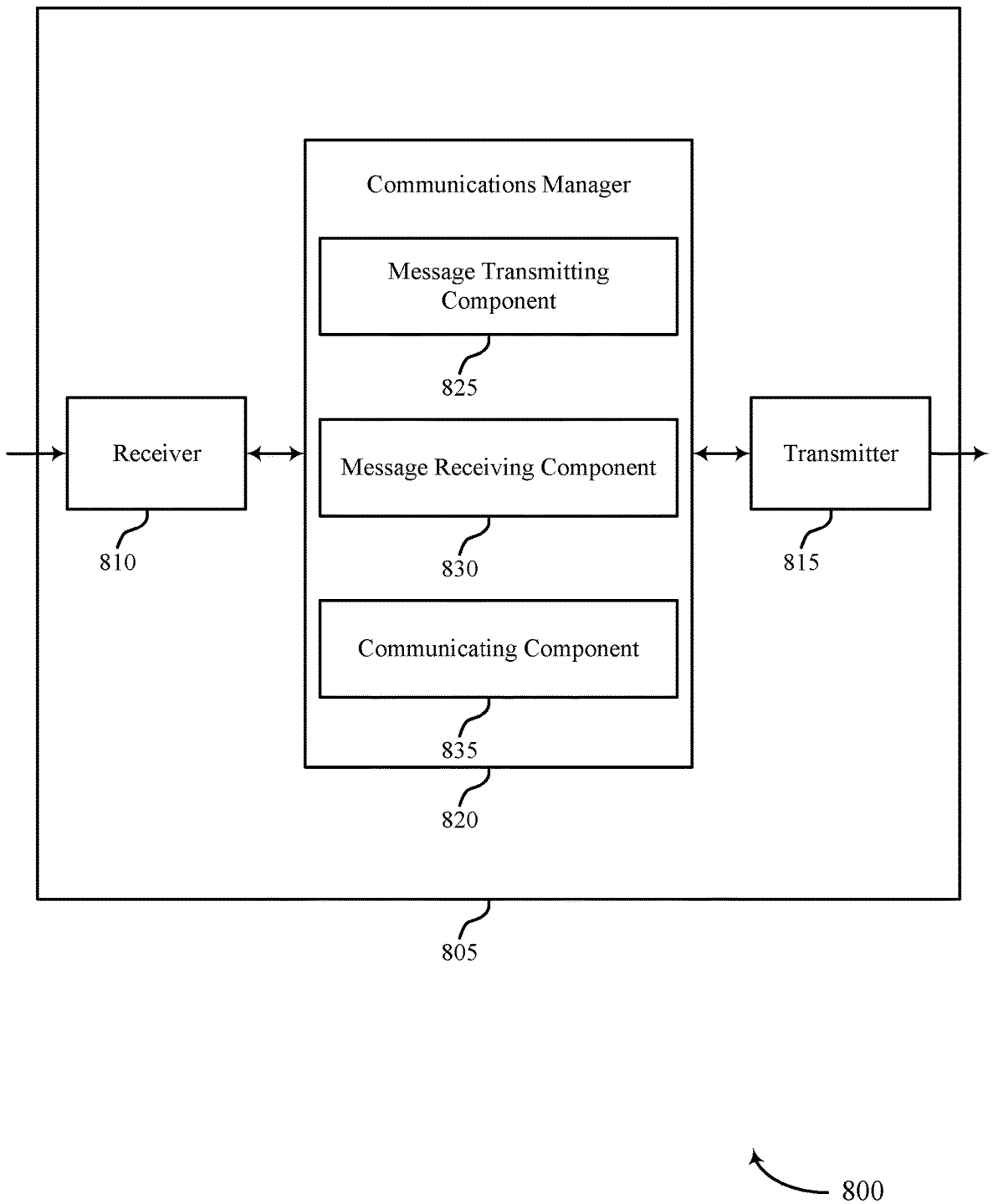

FIG. 8 shows a block diagram 800 of a device 805 that supports techniques for joint modulation of data with tone reservation signals in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for joint modulation of data with tone reservation signals). Information may be passed on to other components of the device 805. The receiver 810 may utilize a single antenna or multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for joint modulation of data with tone reservation signals). In some examples, the transmitter 815 may be co-located with a receiver 810 in a transceiver module. The transmitter 815 may utilize a single antenna or multiple antennas.

The device 805, or various components thereof, may be an example of means for performing various aspects of techniques for joint modulation of data with tone reservation signals as described herein. For example, the communications manager 820 may include a message transmitting component 825, a message receiving component 830, a communicating component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at the device 805 (e.g., a UE 115) in accordance with examples as disclosed herein. The message transmitting component 825 may be configured as or otherwise support a means for transmitting a first message indicating a capability of the device 805 to jointly modulate data with tone reservation signals on an individual subcarrier basis. The message receiving component 830 may be configured as or otherwise support a means for receiving, from a base station and based on the first message, a second message activating joint modulation of data with tone reservation signals for the device 805. The communicating component 835 may be configured as or otherwise support a means for communicating with the base station over multiple subcarriers in accordance with the second message, where one or more subcarriers of the multiple subcarriers carry data jointly modulated with tone reservation signals on the individual subcarrier basis.

Figure 9:
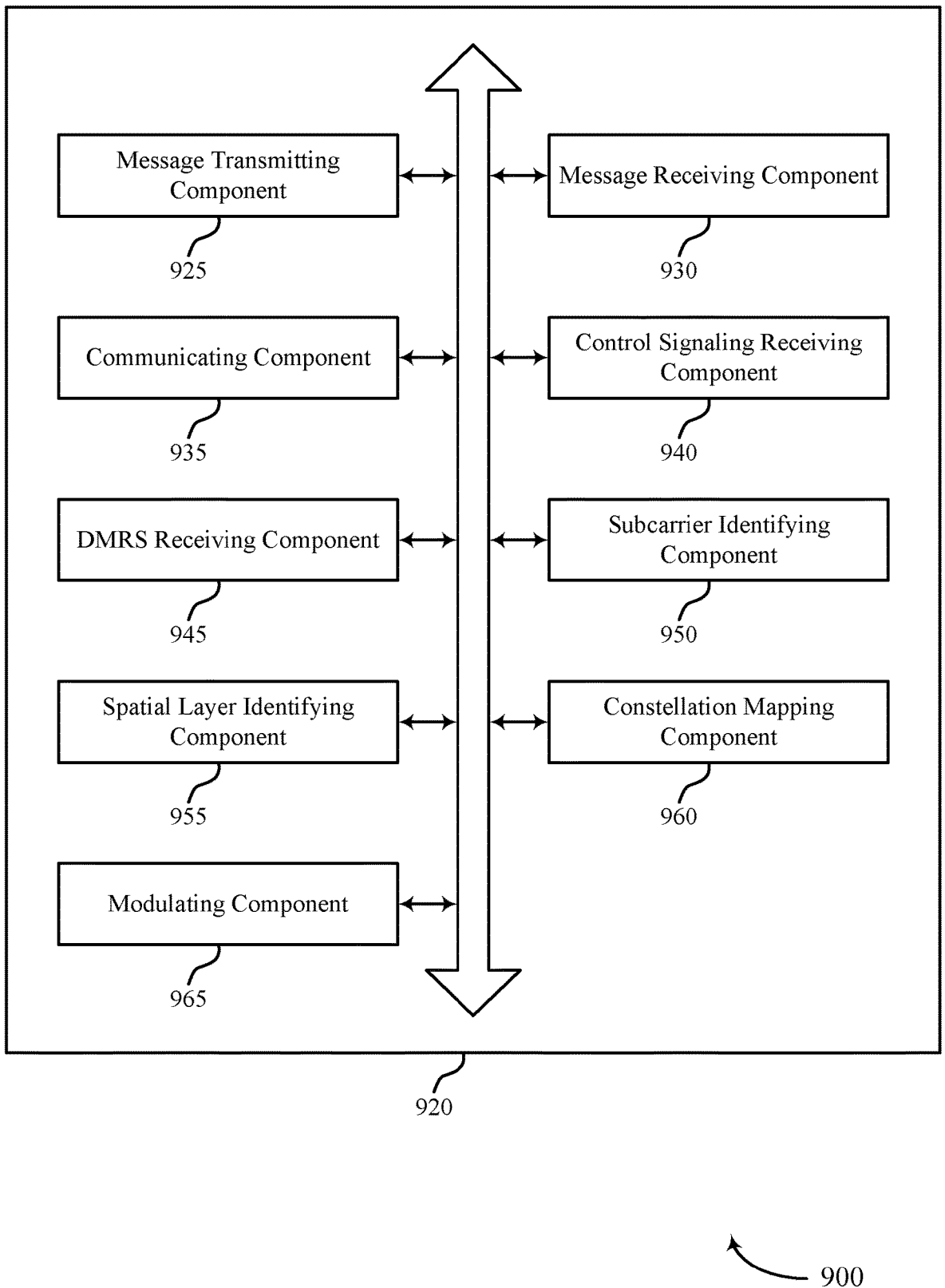
FIG. 9 shows a block diagram of a communications manager that supports techniques for joint modulation of data with tone reservation signals in accordance with aspects of the present disclosure.

FIG. 9 shows a block diagram 900 of a communications manager 920 that supports techniques for joint modulation of data with tone reservation signals in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for joint modulation of data with tone reservation signals as described herein. For example, the communications manager 920 may include a message transmitting component 925, a message receiving component 930, a communicating component 935, a control signaling receiving component 940, a DMRS receiving component 945, a subcarrier identifying component 950, a spatial layer identifying component 955, a constellation mapping component 960, a modulating component 965, or any combination thereof. Each of these components may communicate, directly or indirectly, with one another (e.g., via one or more buses).

The communications manager 920 may support wireless communications at the device 905 (e.g., a UE 115) in accordance with examples as disclosed herein. The message transmitting component 925 may be configured as or otherwise support a means for transmitting a first message indicating a capability of the device 905 to jointly modulate data with tone reservation signals on an individual subcarrier basis. The message receiving component 930 may be configured as or otherwise support a means for receiving, from a base station and based on the first message, a second message activating joint modulation of data with tone reservation signals for the device 905. The communicating component 935 may be configured as or otherwise support a means for communicating with the base station over multiple subcarriers in accordance with the second message, where one or more subcarriers of the multiple subcarriers carry data jointly modulated with tone reservation signals on the individual subcarrier basis.

In some examples, the control signaling receiving component 940 may be configured as or otherwise support a means for receiving, from the base station, control signaling indicating one or more search metrics, the one or more search metrics including a channel energy threshold, a channel capacity threshold, a channel covariance matrix condition number threshold, a channel covariance matrix determinant threshold, a channel covariance matrix eigenvalue summation threshold, a channel covariance matrix eigenvalue threshold, or any combination thereof. In some examples, the DMRS receiving component 945 may be configured as or otherwise support a means for receiving, from the base station, one or more DMRSs. In some examples, the subcarrier identifying component 950 may be configured as or otherwise support a means for identifying the one or more subcarriers of the multiple subcarriers based on the one or more search metrics and the one or more DMRSs.

In some examples, the control signaling receiving component 940 may be configured as or otherwise support a means for receiving, from the base station, control signaling indicating a quantity of subcarriers to be used for joint modulation of data with tone reservation signals, one or more search metrics associated with the quantity of subcarriers, a quantity of spatial layers to be used for joint modulation of data with tone reservation signals, a precoding scheme to be used for joint modulation of data with tone reservation signals, or any combination thereof, where communicating with the base station over the multiple subcarriers is based on the control signaling. In some examples, the precoding scheme includes an SVD precoding scheme. In some examples, the quantity of subcarriers to be used for joint modulation of data with tone reservation signals is indicated as a percentage of the multiple subcarriers.

In some examples, the modulating component 965 may be configured as or otherwise support a means for performing joint modulation of data with tone reservation signals in accordance with one or both of a diagonalization precoding scheme or the precoding scheme indicated by the control signaling. In some examples, the control signaling includes an RRC message, a MAC-CE, an instance of DCI, or any combination thereof.

In some examples, the spatial layer identifying component 955 may be configured as or otherwise support a means for identifying a first set of spatial layers corresponding to a first set of channel eigenvalues and a second set of spatial layers corresponding to a second set of channel eigenvalues, where the first set of channel eigenvalues is below a threshold and the second set of channel eigenvalues is above the threshold. In some examples, the spatial layer identifying component 955 may be configured as or otherwise support a means for allocating the first set of spatial layers for the data jointly modulated with the tone reservation signals based on the first set of channel eigenvalues being below the threshold. In some examples, the spatial layer identifying component 955 may be configured as or otherwise support a means for allocating the second set of spatial layers for data modulated without tone reservation signals based on the second set of channel eigenvalues being above the threshold.

In some examples, to support communicating with the base station over the multiple subcarriers, the communicating component 935 may be configured as or otherwise support a means for communicating the data jointly modulated with the tone reservation signals via the first set of spatial layers.

In some examples, the control signaling receiving component 940 may be configured as or otherwise support a means for receiving an indication of a channel eigenvalue threshold from the base station, where a quantity of spatial layers to be used for joint modulation of data with tone reservation signals is based on the channel eigenvalue threshold.

In some examples, the constellation mapping component 960 may be configured as or otherwise support a means for mapping each of the tone reservation signals to a defined symbol location of a constellation map used for data modulation in accordance with a hard slicing procedure. In some examples, the first message indicates a capability of the device 905 to support joint modulation of data with tone reservation signals in accordance with the hard slicing procedure. In some examples, the second message activates joint modulation of data with tone reservation signals in accordance with the hard slicing procedure.

Figure 10:
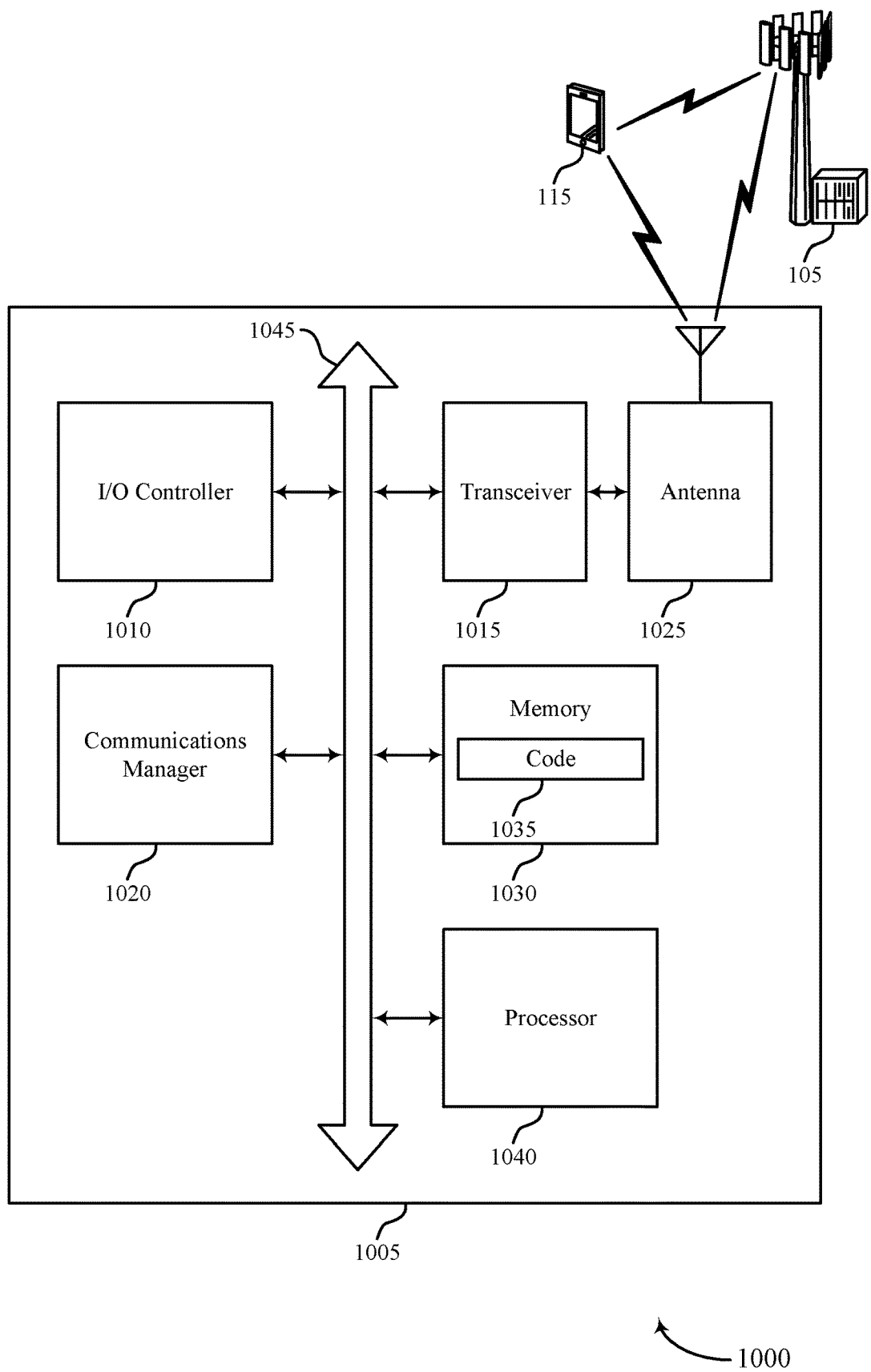
FIG. 10 shows a diagram of a system including a device that supports techniques for joint modulation of data with tone reservation signals in accordance with aspects of the present disclosure.

FIG. 10 shows a diagram of a system 1000 including a device 1005 that supports techniques for joint modulation of data with tone reservation signals in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for joint modulation of data with tone reservation signals). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at the device 1005 (e.g., a UE 115) in accordance with examples as disclosed herein. For example, the communications manager 1020 may be configured as or otherwise support a means for transmitting a first message indicating a capability of the device 1005 to jointly modulate data with tone reservation signals on an individual subcarrier basis. The communications manager 1020 may be configured as or otherwise support a means for receiving, from a base station and based on the first message, a second message activating joint modulation of data with tone reservation signals for the device 1005. The communications manager 1020 may be configured as or otherwise support a means for communicating with the base station over multiple subcarriers in accordance with the second message, where one or more subcarriers of the multiple subcarriers carry data jointly modulated with tone reservation signals on the individual subcarrier basis.

By including or configuring the communications manager 1020 in accordance with examples as described herein, the device 1005 may support techniques for higher throughput levels based on jointly modulating data with tone reservation signals on an individual subcarrier basis. As a result, the device 1005 may utilize a larger number of subcarriers for data transmission, which may enable the device 1005 to attain higher throughput levels, reduced latency, and improved spectral efficiency, among other benefits.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for joint modulation of data with tone reservation signals as described herein, or the processor 1040 and the memory 1030 may be otherwise configured to perform or support such operations.

Figure 11:
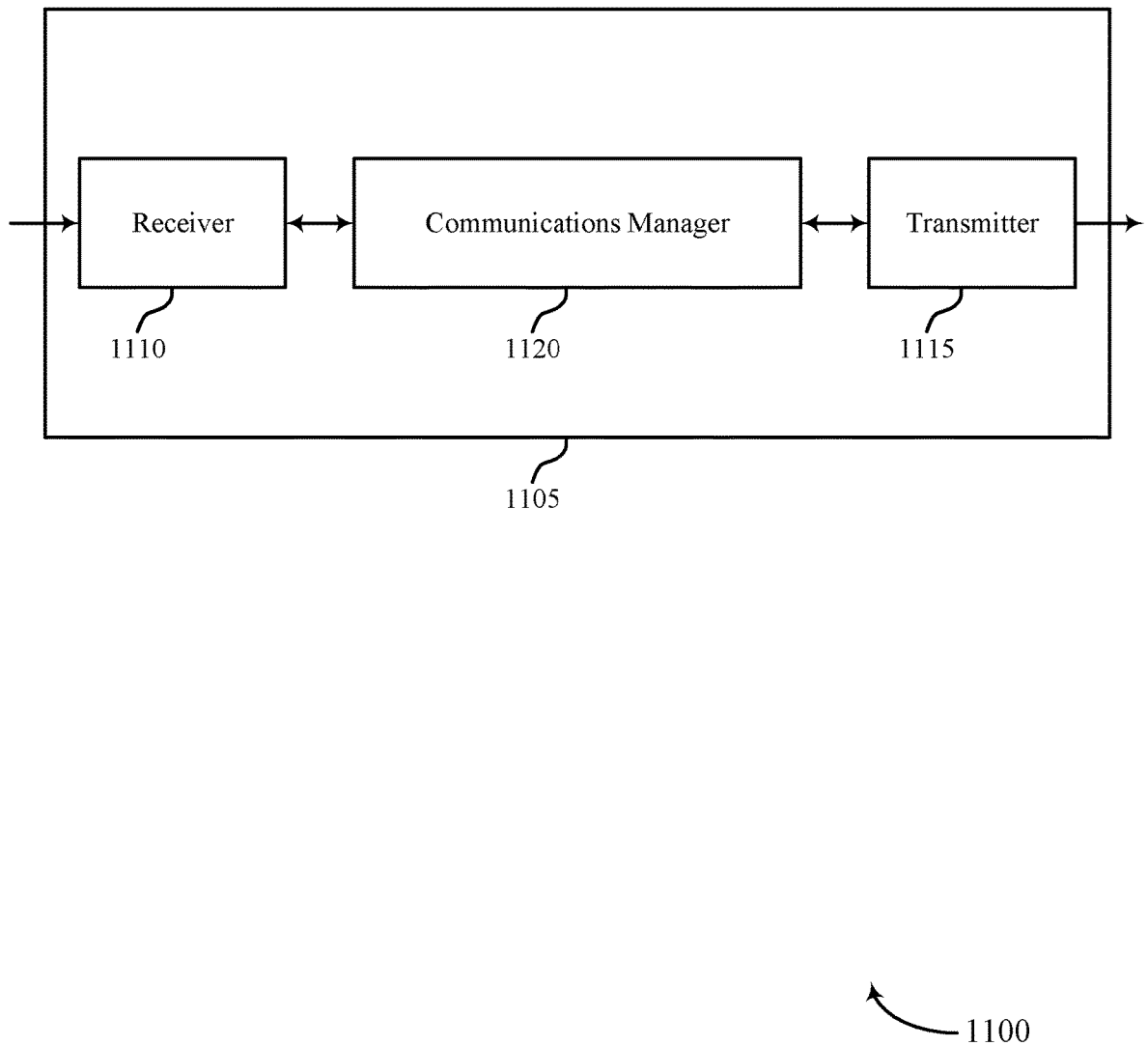
FIGS. 11 and 12 show block diagrams of devices that support techniques for joint modulation of data with tone reservation signals in accordance with aspects of the present disclosure.

FIG. 11 shows a block diagram 1100 of a device 1105 that supports techniques for joint modulation of data with tone reservation signals in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for joint modulation of data with tone reservation signals). Information may be passed on to other components of the device 1105. The receiver 1110 may utilize a single antenna or multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for joint modulation of data with tone reservation signals). In some examples, the transmitter 1115 may be co-located with a receiver 1110 in a transceiver module. The transmitter 1115 may utilize a single antenna or multiple antennas.

The communications manager 1120, the receiver 1110, the transmitter 1115, or various combinations thereof or various components thereof may be examples of means for performing various aspects of techniques for joint modulation of data with tone reservation signals as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at the device 1105 (e.g., a base station 105) in accordance with examples as disclosed herein. For example, the communications manager 1120 may be configured as or otherwise support a means for receiving, from a UE, a first message indicating a capability of the UE to jointly modulate data with tone reservation signals on an individual subcarrier basis. The communications manager 1120 may be configured as or otherwise support a means for transmitting, based on the first message, a second message activating joint modulation of data with tone reservation signals for the UE. The communications manager 1120 may be configured as or otherwise support a means for communicating with the UE over multiple subcarriers in accordance with the second message, where one or more subcarriers of the multiple subcarriers carry data jointly modulated with tone reservation signals on the individual subcarrier basis.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced power consumption based on transmitting data that is jointly modulated with tone reservation signals. Modulating data with tone reservation signals may lower the PAPR of signals transmitted by the device 1105, which may reduce PA power consumption at the device 1105, among other benefits.

Figure 12:
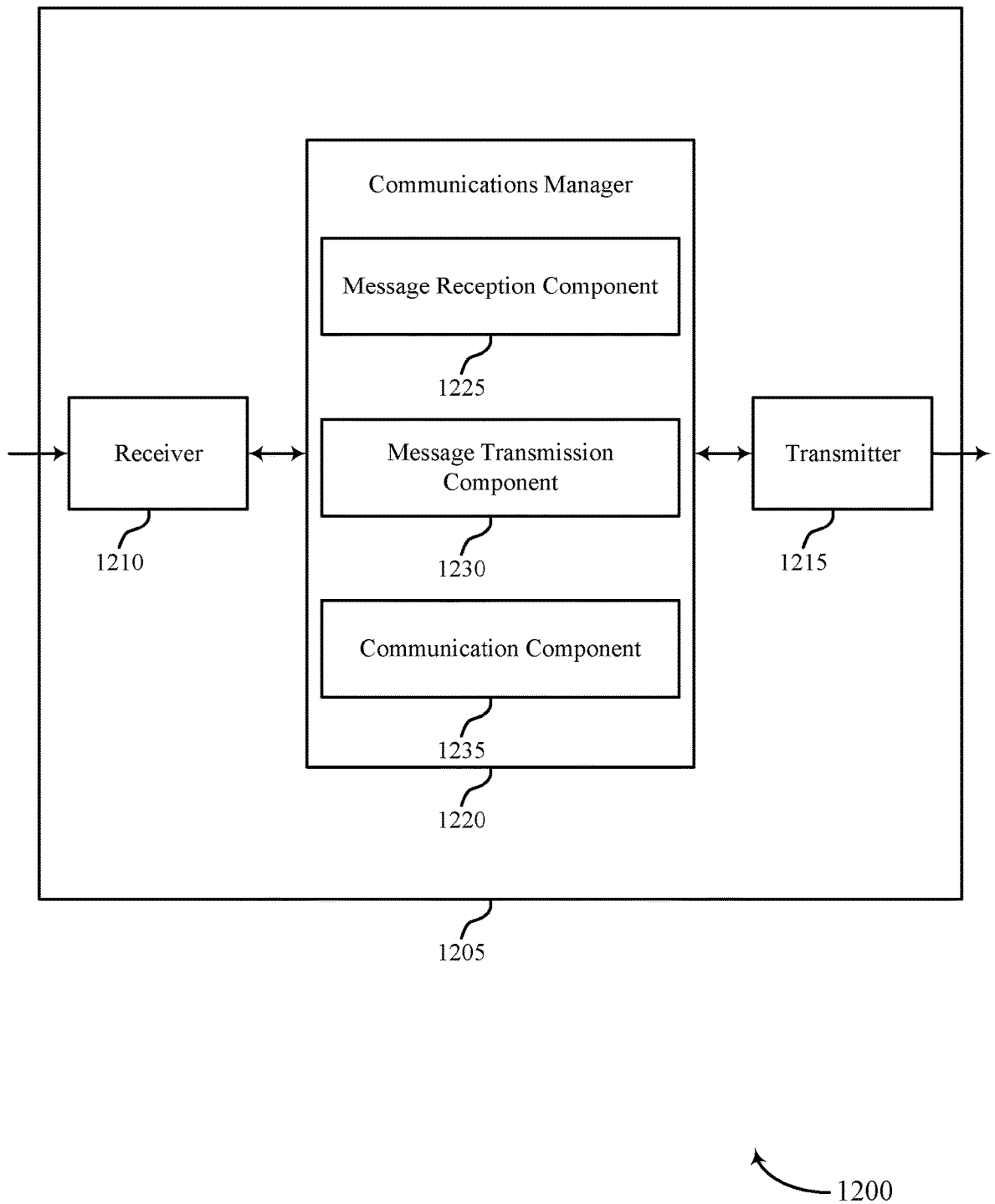

FIG. 12 shows a block diagram 1200 of a device 1205 that supports techniques for joint modulation of data with tone reservation signals in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for joint modulation of data with tone reservation signals). Information may be passed on to other components of the device 1205. The receiver 1210 may utilize a single antenna or multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for joint modulation of data with tone reservation signals). In some examples, the transmitter 1215 may be co-located with a receiver 1210 in a transceiver module. The transmitter 1215 may utilize a single antenna or multiple antennas.

The device 1205, or various components thereof, may be an example of means for performing various aspects of techniques for joint modulation of data with tone reservation signals as described herein. For example, the communications manager 1220 may include a message reception component 1225, a message transmission component 1230, a communication component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at the device 1205 (e.g., a base station 105) in accordance with examples as disclosed herein. The message reception component 1225 may be configured as or otherwise support a means for receiving, from a UE, a first message indicating a capability of the UE to jointly modulate data with tone reservation signals on an individual subcarrier basis. The message transmission component 1230 may be configured as or otherwise support a means for transmitting, based on the first message, a second message activating joint modulation of data with tone reservation signals for the UE. The communication component 1235 may be configured as or otherwise support a means for communicating with the UE over multiple subcarriers in accordance with the second message, where one or more subcarriers of the multiple subcarriers carry data jointly modulated with tone reservation signals on the individual subcarrier basis.

Figure 13:
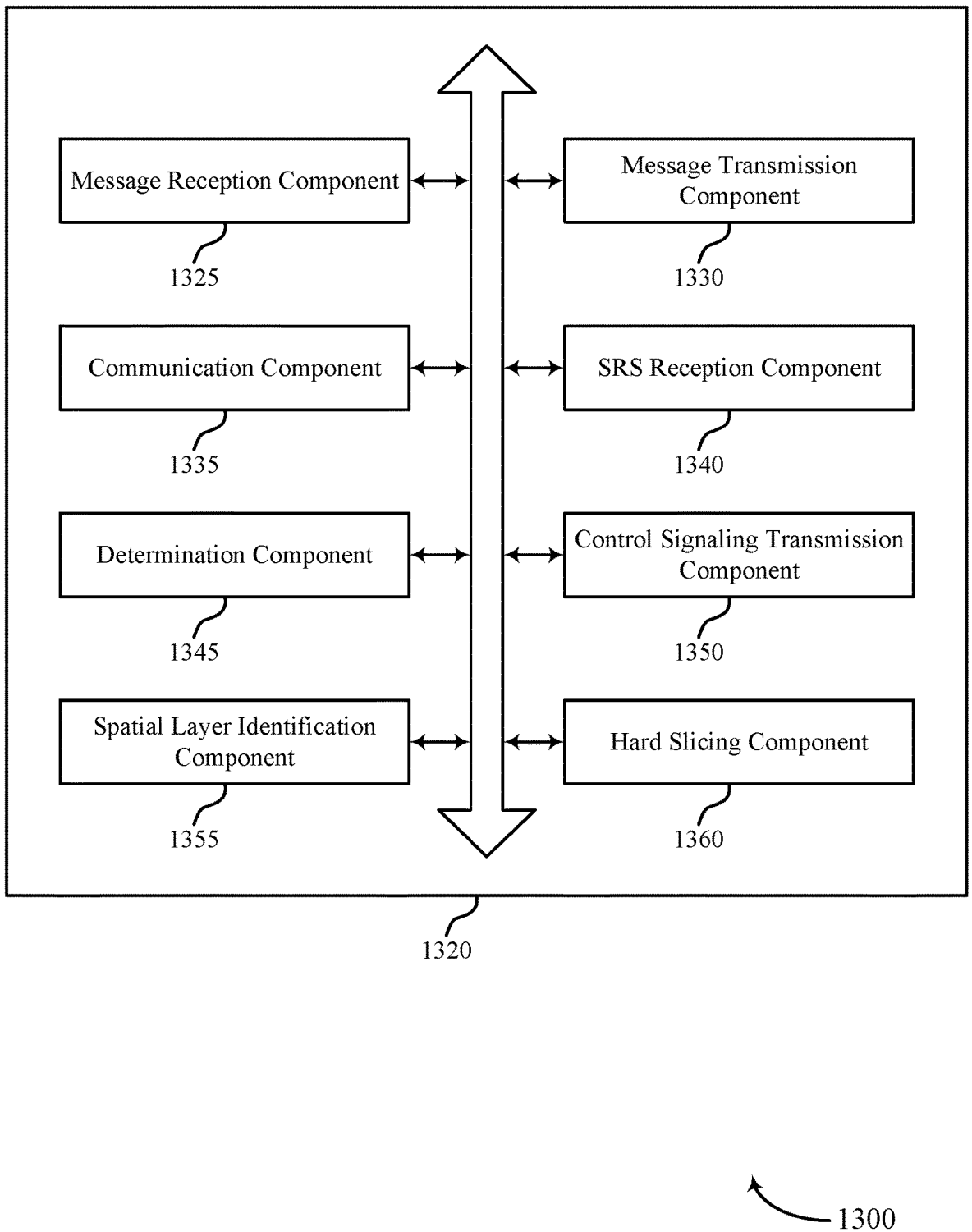
FIG. 13 shows a block diagram of a communications manager that supports techniques for joint modulation of data with tone reservation signals in accordance with aspects of the present disclosure.

FIG. 13 shows a block diagram 1300 of a communications manager 1320 that supports techniques for joint modulation of data with tone reservation signals in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for joint modulation of data with tone reservation signals as described herein. For example, the communications manager 1320 may include a message reception component 1325, a message transmission component 1330, a communication component 1335, an SRS reception component 1340, a determination component 1345, a control signaling transmission component 1350, a spatial layer identification component 1355, a hard slicing component 1360, or any combination thereof. Each of these components may communicate, directly or indirectly, with one another (e.g., via one or more buses).

The communications manager 1320 may support wireless communications at the device 1305 (e.g., a base station 105) in accordance with examples as disclosed herein. The message reception component 1325 may be configured as or otherwise support a means for receiving, from a UE, a first message indicating a capability of the UE to jointly modulate data with tone reservation signals on an individual subcarrier basis. The message transmission component 1330 may be configured as or otherwise support a means for transmitting, based on the first message, a second message activating joint modulation of data with tone reservation signals for the UE. The communication component 1335 may be configured as or otherwise support a means for communicating with the UE over multiple subcarriers in accordance with the second message, where one or more subcarriers of the multiple subcarriers carry data jointly modulated with tone reservation signals on the individual subcarrier basis.

In some examples, the SRS reception component 1340 may be configured as or otherwise support a means for receiving, from the UE, one or more SRSs. In some examples, the determination component 1345 may be configured as or otherwise support a means for determining a downlink channel estimate, a quantity of spatial layers to be used for joint modulation of data with tone reservation signals, a quantity of subcarriers to be used for joint modulation of data with tone reservation signals, a channel eigenvalue threshold associated with the quantity of subcarriers, or any combination thereof based on the one or more SRSs.

In some examples, the control signaling transmission component 1350 may be configured as or otherwise support a means for transmitting control signaling indicating whether joint modulation of data with tone reservation signals is activated for the UE, a quantity of subcarriers to be used for joint modulation of data with tone reservation signals, one or more search metrics associated with the quantity of subcarriers to be used for joint modulation of data with tone reservation signals, a precoding scheme to be used for joint modulation of data with tone reservation signals, or any combination thereof, where communicating with the UE over the multiple subcarriers is based on the control signaling.

In some examples, the one or more search metrics include a channel energy threshold, a channel capacity threshold, a channel covariance matrix condition number threshold, a channel covariance matrix determinant threshold, a channel covariance matrix eigenvalue summation threshold, a channel covariance matrix eigenvalue threshold, or any combination thereof. In some examples, the precoding scheme includes an SVD precoding scheme. In some examples, the quantity of subcarriers to be used for joint modulation of data with tone reservation signals is indicated as a percentage of the multiple subcarriers. In some examples, the control signaling includes an RRC message, a MAC-CE, an instance of DCI, or any combination thereof.

In some examples, the spatial layer identification component 1355 may be configured as or otherwise support a means for identifying a first set of spatial layers corresponding to a first set of channel eigenvalues and a second set of spatial layers corresponding to a second set of channel eigenvalues, where the first set of channel eigenvalues is below a threshold and the second set of channel eigenvalues is above the threshold. In some examples, the spatial layer identification component 1355 may be configured as or otherwise support a means for allocating the first set of spatial layers for the data jointly modulated with the tone reservation signals based on the first set of channel eigenvalues being below the threshold. In some examples, the spatial layer identification component 1355 may be configured as or otherwise support a means for allocating the second set of spatial layers for data modulated without tone reservation signals based on the second set of channel eigenvalues being above the threshold.

In some examples, to support communicating with the UE over the multiple subcarriers, the communication component 1335 may be configured as or otherwise support a means for communicating the data jointly modulated with the tone reservation signals via the first set of spatial layers.

In some examples, the control signaling transmission component 1350 may be configured as or otherwise support a means for transmitting an indication of a channel eigenvalue threshold, where a quantity of spatial layers to be used for joint modulation of data with tone reservation signals is based on the channel eigenvalue threshold. In some examples, a code rate to be used for joint modulation of data with tone reservation signals or a transfer block size to be used for joint modulation of data with tone reservation signals is based on a quantity of spatial layers to be used for joint modulation of data with tone reservation signals.

In some examples, the control signaling transmission component 1350 may be configured as or otherwise support a means for transmitting control signaling indicating a dynamic rank percentage to be used for joint modulation of data with tone reservation signals, where communicating with the UE over the multiple subcarriers is based on the control signaling.

In some examples, the hard slicing component 1360 may be configured as or otherwise support a means for mapping each of the tone reservation signals to a defined symbol location of a constellation map used for data modulation in accordance with a hard slicing procedure. In some examples, the first message indicates a capability of the UE to support joint modulation of data with tone reservation signals in accordance with the hard slicing procedure. In some examples, the second message activates joint modulation of data with tone reservation signals in accordance with the hard slicing procedure.

Figure 14:
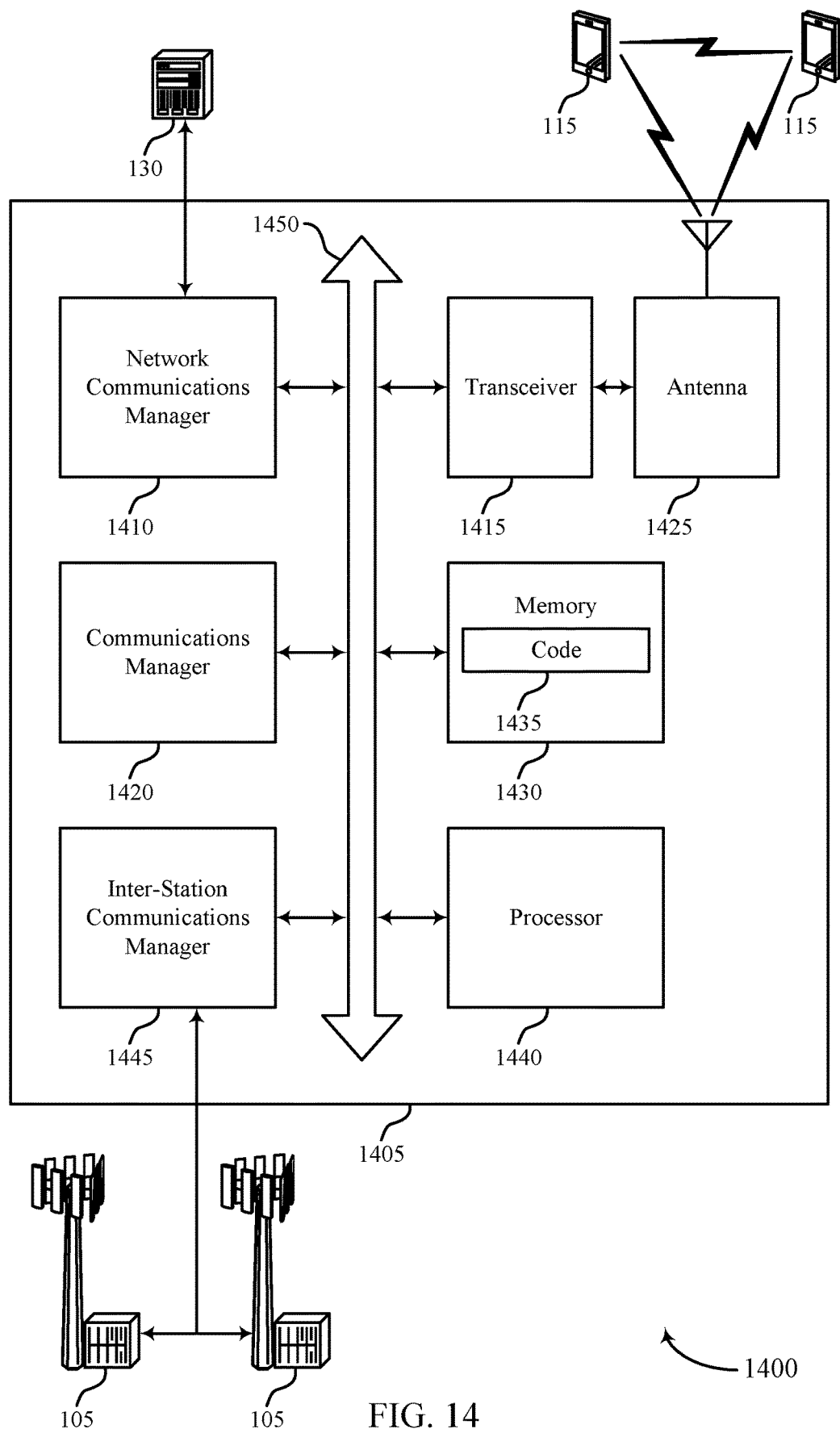
FIG. 14 shows a diagram of a system including a device that supports techniques for joint modulation of data with tone reservation signals in accordance with aspects of the present disclosure.

FIG. 14 shows a diagram of a system 1400 including a device 1405 that supports techniques for joint modulation of data with tone reservation signals in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for joint modulation of data with tone reservation signals). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at the device 1405 (e.g., a base station 105) in accordance with examples as disclosed herein. For example, the communications manager 1420 may be configured as or otherwise support a means for receiving, from a UE, a first message indicating a capability of the UE to jointly modulate data with tone reservation signals on an individual subcarrier basis. The communications manager 1420 may be configured as or otherwise support a means for transmitting, based on the first message, a second message activating joint modulation of data with tone reservation signals for the UE. The communications manager 1420 may be configured as or otherwise support a means for communicating with the UE over multiple subcarriers in accordance with the second message, where one or more subcarriers of the multiple subcarriers carry data jointly modulated with tone reservation signals on the individual subcarrier basis.

By including or configuring the communications manager 1420 in accordance with examples as described herein, the device 1405 may support techniques for higher throughput levels based on jointly modulating data with tone reservation signals on an individual subcarrier basis. As a result, the device 1405 may utilize a larger number of subcarriers for data transmission, which may enable the device 1405 to attain higher throughput levels, reduced latency, and improved spectral efficiency, among other benefits.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for joint modulation of data with tone reservation signals as described herein, or the processor 1440 and the memory 1430 may be otherwise configured to perform or support such operations.

Figure 15:
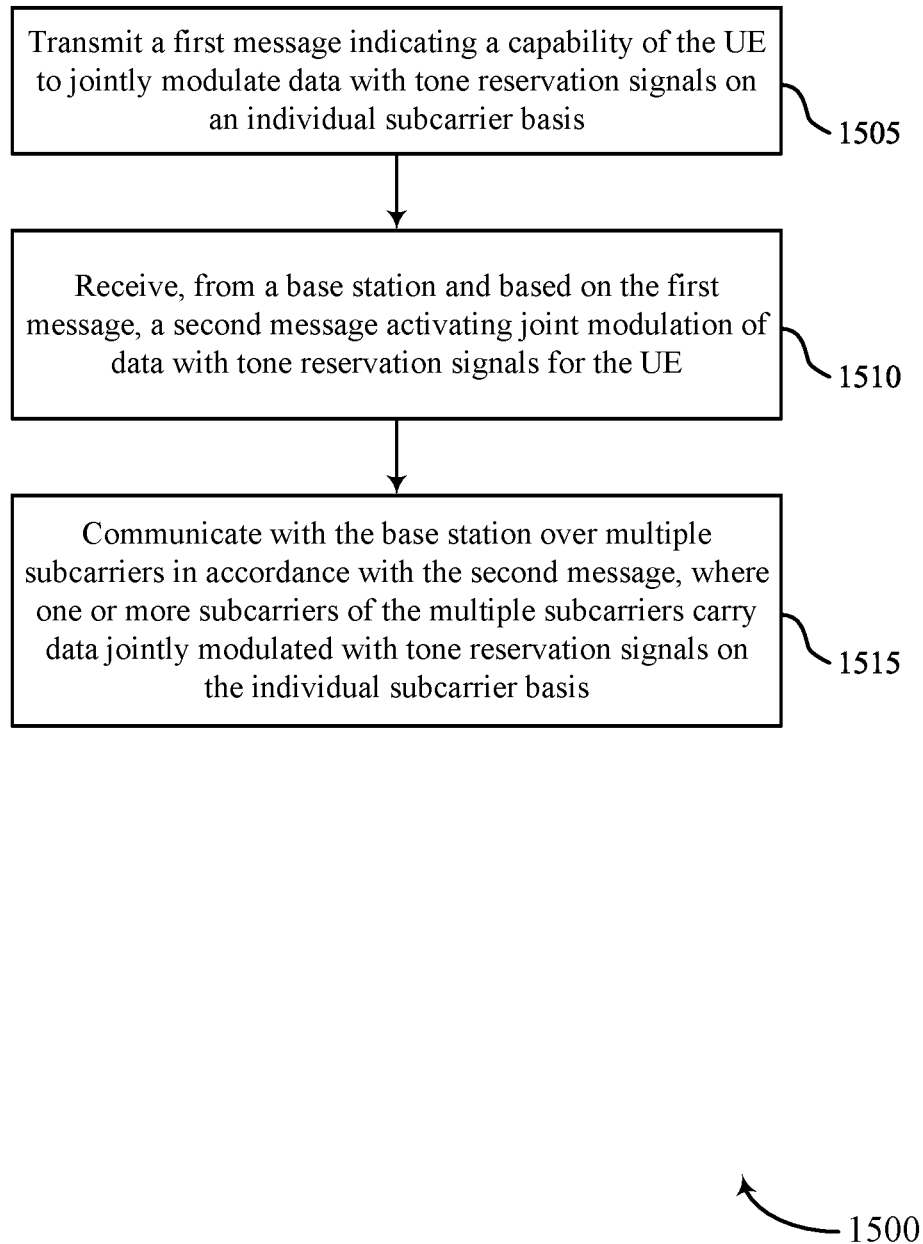
FIGS. 15 through 18 show flowcharts illustrating methods that support techniques for joint modulation of data with tone reservation signals in accordance with aspects of the present disclosure.

FIG. 15 shows a flowchart illustrating a method 1500 that supports techniques for joint modulation of data with tone reservation signals in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include transmitting a first message indicating a capability of the UE to jointly modulate data with tone reservation signals on an individual subcarrier basis. The operations of 1505 may be performed in accordance with examples as disclosed herein. In some examples, aspects of the operations of 1505 may be performed by a message transmitting component 925 as described with reference to FIG. 9.

At 1510, the method may include receiving, from a base station and based on the first message, a second message activating joint modulation of data with tone reservation signals for the UE. The operations of 1510 may be performed in accordance with examples as disclosed herein. In some examples, aspects of the operations of 1510 may be performed by a message receiving component 930 as described with reference to FIG. 9.

At 1515, the method may include communicating with the base station over multiple subcarriers in accordance with the second message, where one or more subcarriers of the multiple subcarriers carry data jointly modulated with tone reservation signals on the individual subcarrier basis. The operations of 1515 may be performed in accordance with examples as disclosed herein. In some examples, aspects of the operations of 1515 may be performed by a communicating component 935 as described with reference to FIG. 9.

Figure 16:
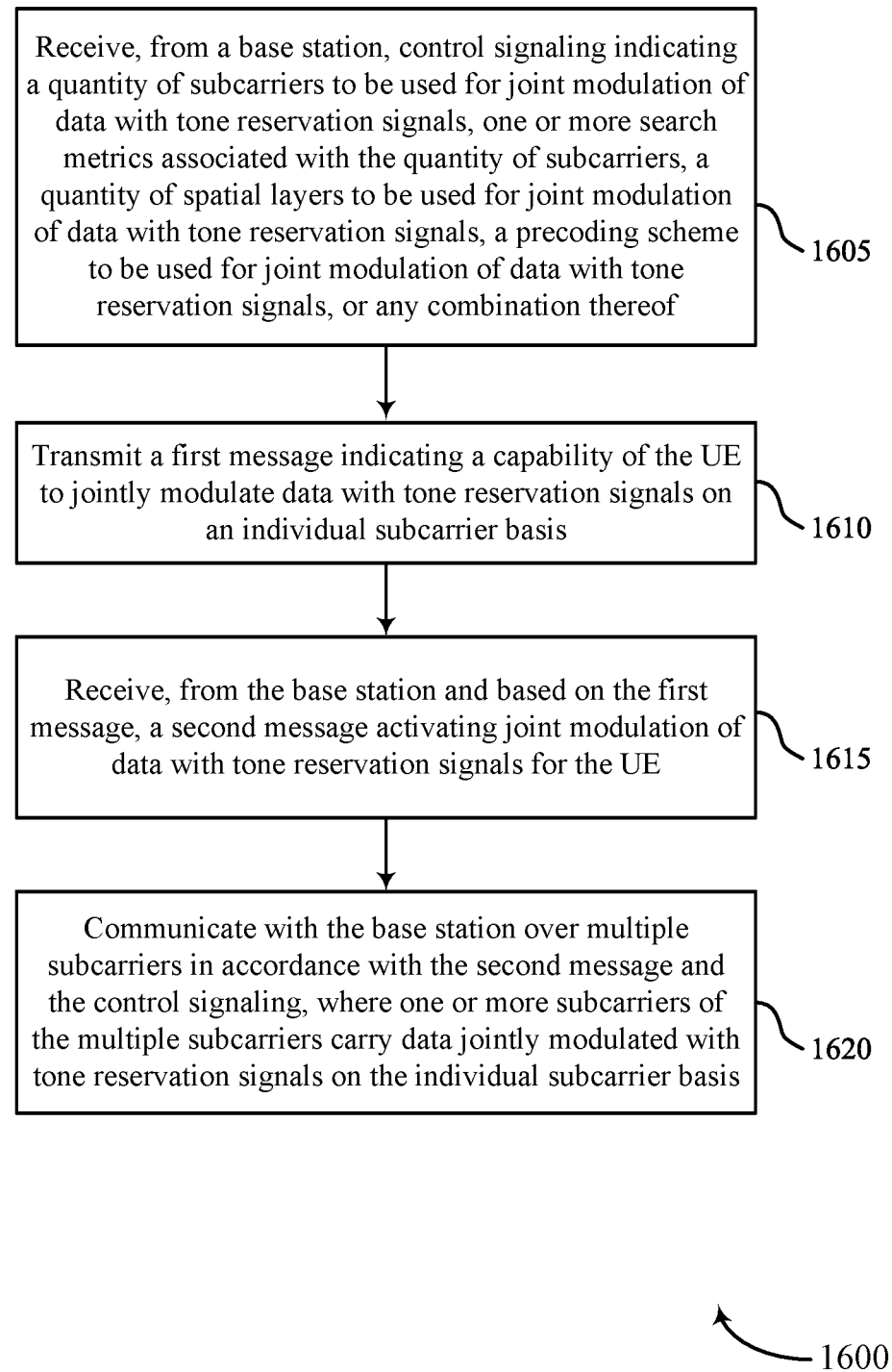

FIG. 16 shows a flowchart illustrating a method 1600 that supports techniques for joint modulation of data with tone reservation signals in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling indicating a quantity of subcarriers to be used for joint modulation of data with tone reservation signals, one or more search metrics associated with the quantity of subcarriers, a quantity of spatial layers to be used for joint modulation of data with tone reservation signals, a precoding scheme to be used for joint modulation of data with tone reservation signals, or any combination thereof. The operations of 1605 may be performed in accordance with examples as disclosed herein. In some examples, aspects of the operations of 1605 may be performed by a control signaling receiving component 940 as described with reference to FIG. 9.

At 1610, the method may include transmitting a first message indicating a capability of the UE to jointly modulate data with tone reservation signals on an individual subcarrier basis. The operations of 1610 may be performed in accordance with examples as disclosed herein. In some examples, aspects of the operations of 1610 may be performed by a message transmitting component 925 as described with reference to FIG. 9.

At 1615, the method may include receiving, from the base station and based on the first message, a second message activating joint modulation of data with tone reservation signals for the UE. The operations of 1615 may be performed in accordance with examples as disclosed herein. In some examples, aspects of the operations of 1615 may be performed by a message receiving component 930 as described with reference to FIG. 9.

At 1620, the method may include communicating with the base station over multiple subcarriers in accordance with the second message and the control signaling, where one or more subcarriers of the multiple subcarriers carry data jointly modulated with tone reservation signals on the individual subcarrier basis. The operations of 1620 may be performed in accordance with examples as disclosed herein. In some examples, aspects of the operations of 1620 may be performed by a communicating component 935 as described with reference to FIG. 9.

Figure 17:
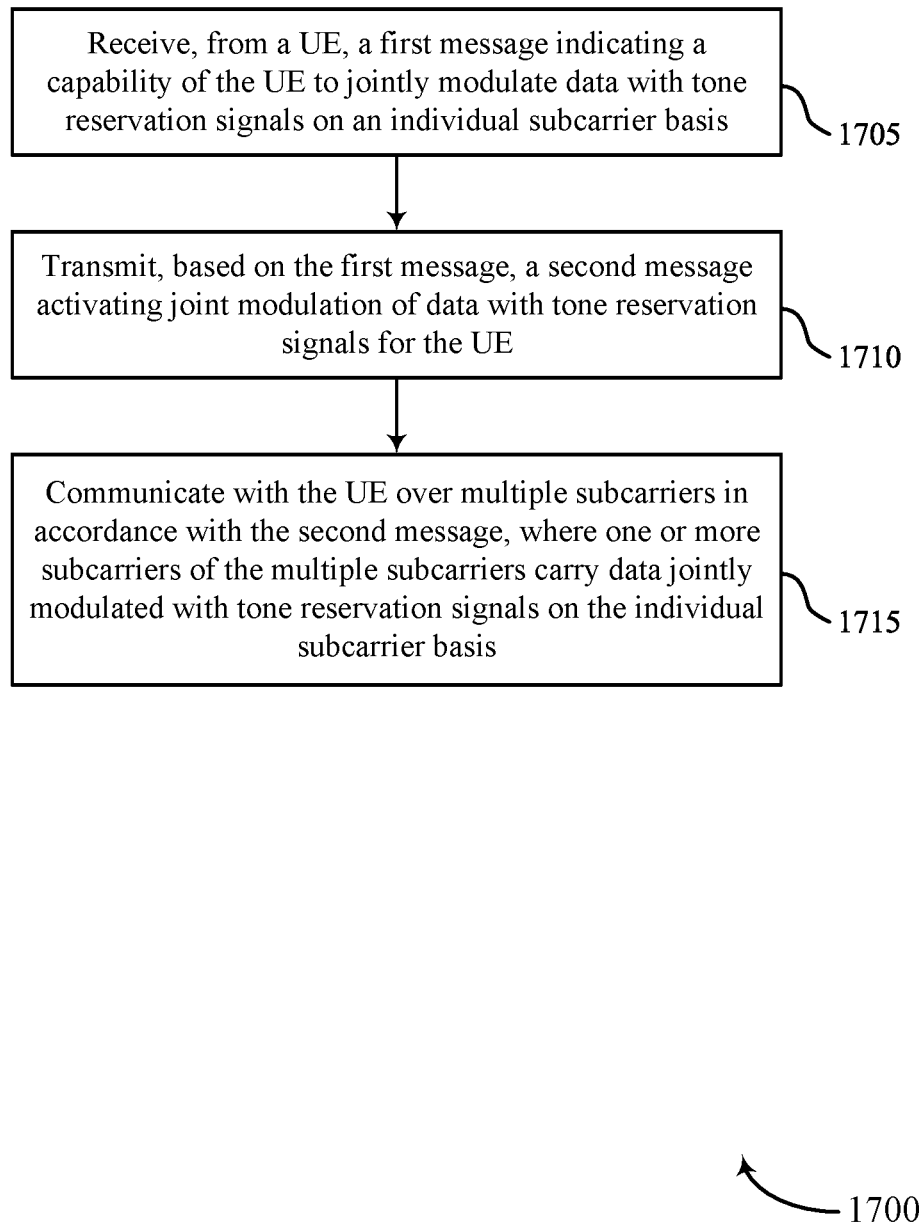

FIG. 17 shows a flowchart illustrating a method 1700 that supports techniques for joint modulation of data with tone reservation signals in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, a first message indicating a capability of the UE to jointly modulate data with tone reservation signals on an individual subcarrier basis. The operations of 1705 may be performed in accordance with examples as disclosed herein. In some examples, aspects of the operations of 1705 may be performed by a message reception component 1325 as described with reference to FIG. 13.

At 1710, the method may include transmitting, based on the first message, a second message activating joint modulation of data with tone reservation signals for the UE. The operations of 1710 may be performed in accordance with examples as disclosed herein. In some examples, aspects of the operations of 1710 may be performed by a message transmission component 1330 as described with reference to FIG. 13.

At 1715, the method may include communicating with the UE over multiple subcarriers in accordance with the second message, where one or more subcarriers of the multiple subcarriers carry data jointly modulated with tone reservation signals on the individual subcarrier basis. The operations of 1715 may be performed in accordance with examples as disclosed herein. In some examples, aspects of the operations of 1715 may be performed by a communication component 1335 as described with reference to FIG. 13.

Figure 18:
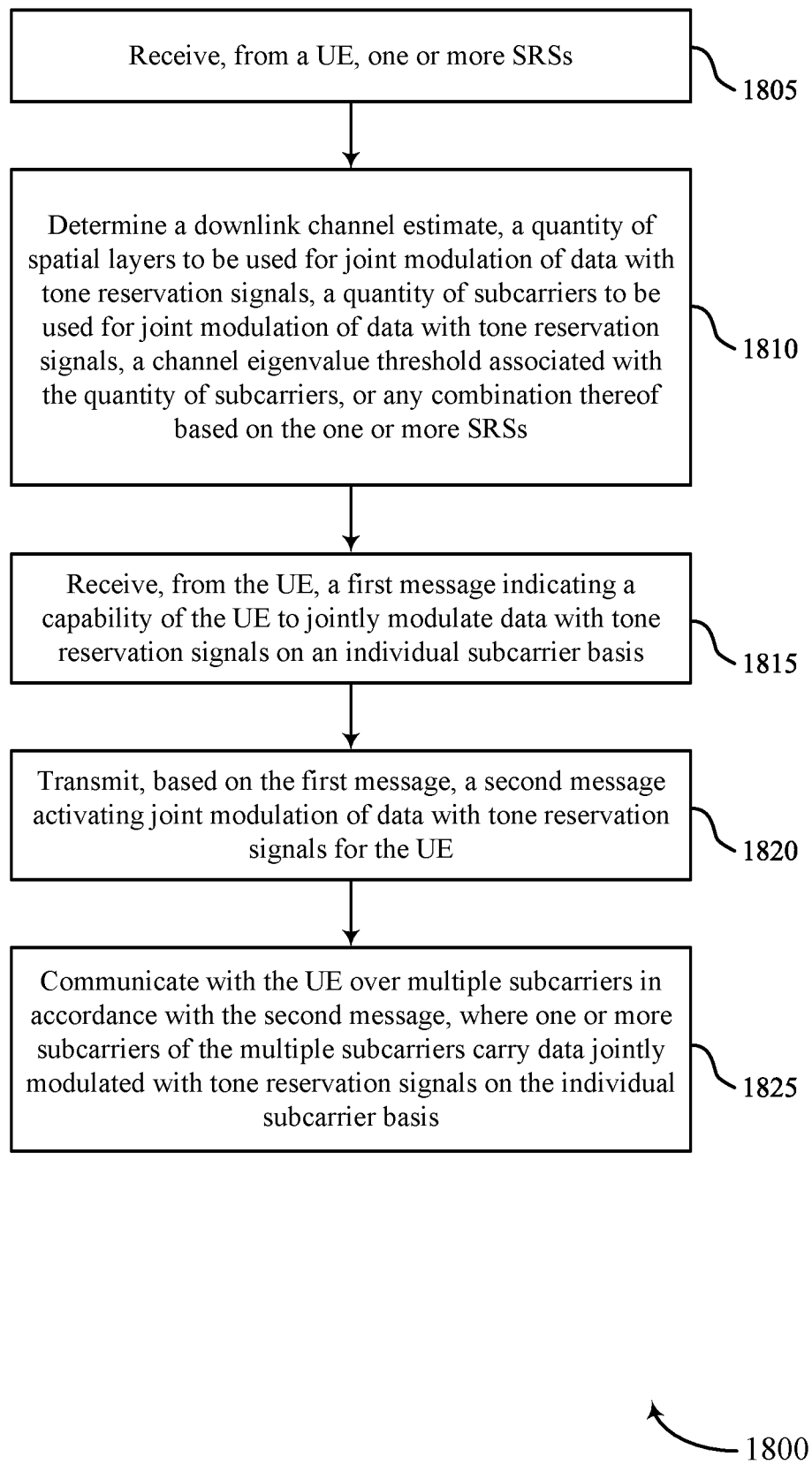

FIG. 18 shows a flowchart illustrating a method 1800 that supports techniques for joint modulation of data with tone reservation signals in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include receiving, from a UE, one or more SRSs. The operations of 1805 may be performed in accordance with examples as disclosed herein. In some examples, aspects of the operations of 1805 may be performed by an SRS reception component 1340 as described with reference to FIG. 13.

At 1810, the method may include determining a downlink channel estimate, a quantity of spatial layers to be used for joint modulation of data with tone reservation signals, a quantity of subcarriers to be used for joint modulation of data with tone reservation signals, a channel eigenvalue threshold associated with the quantity of subcarriers, or any combination thereof based on the one or more SRSs. The operations of 1810 may be performed in accordance with examples as disclosed herein. In some examples, aspects of the operations of 1810 may be performed by a determination component 1345 as described with reference to FIG. 13.

At 1815, the method may include receiving, from the UE, a first message indicating a capability of the UE to jointly modulate data with tone reservation signals on an individual subcarrier basis. The operations of 1815 may be performed in accordance with examples as disclosed herein. In some examples, aspects of the operations of 1815 may be performed by a message reception component 1325 as described with reference to FIG. 13.

At 1820, the method may include transmitting, based on the first message, a second message activating joint modulation of data with tone reservation signals for the UE. The operations of 1820 may be performed in accordance with examples as disclosed herein. In some examples, aspects of the operations of 1820 may be performed by a message transmission component 1330 as described with reference to FIG. 13.

At 1825, the method may include communicating with the UE over multiple subcarriers in accordance with the second message, where one or more subcarriers of the multiple subcarriers carry data jointly modulated with tone reservation signals on the individual subcarrier basis. The operations of 1825 may be performed in accordance with examples as disclosed herein. In some examples, aspects of the operations of 1825 may be performed by a communication component 1335 as described with reference to FIG. 13.

The following provides an overview of aspects of the present disclosure:

Aspect 1: A method for wireless communications at a UE, comprising: transmitting a first message indicating a capability of the UE to jointly modulate data with tone reservation signals on an individual subcarrier basis; receiving, from a base station and based at least in part on the first message, a second message activating joint modulation of data with tone reservation signals for the UE; and communicating with the base station over a plurality of subcarriers in accordance with the second message, wherein one or more subcarriers of the plurality of subcarriers carry data jointly modulated with tone reservation signals on the individual subcarrier basis.

Aspect 2: The method of aspect 1, further comprising: receiving, from the base station, control signaling indicating one or more search metrics, the one or more search metrics comprising a channel energy threshold, a channel capacity threshold, a channel covariance matrix condition number threshold, a channel covariance matrix determinant threshold, a channel covariance matrix eigenvalue summation threshold, a channel covariance matrix eigenvalue threshold, or any combination thereof; receiving, from the base station, one or more demodulation reference signals; and identifying the one or more subcarriers of the plurality of subcarriers based at least in part on the one or more search metrics and the one or more demodulation reference signals.

Aspect 3: The method of any of aspects 1 through 2, further comprising: receiving, from the base station, control signaling indicating a quantity of subcarriers to be used for joint modulation of data with tone reservation signals, one or more search metrics associated with the quantity of subcarriers, a quantity of spatial layers to be used for joint modulation of data with tone reservation signals, a precoding scheme to be used for joint modulation of data with tone reservation signals, or any combination thereof, wherein communicating with the base station over the plurality of subcarriers is based at least in part on the control signaling.

Aspect 4: The method of aspect 3, wherein the precoding scheme comprises a singular value decomposition precoding scheme.

Aspect 5: The method of any of aspects 3 through 4, wherein the quantity of subcarriers to be used for joint modulation of data with tone reservation signals is indicated as a percentage of the plurality of subcarriers.

Aspect 6: The method of any of aspects 3 through 5, further comprising: performing joint modulation of data with tone reservation signals in accordance with one or both of a diagonalization precoding scheme or the precoding scheme indicated by the control signaling.

Aspect 7: The method of any of aspects 3 through 6, wherein the control signaling comprises a radio resource control message, a medium access control-control element, an instance of downlink control information, or any combination thereof.

Aspect 8: The method of any of aspects 1 through 7, further comprising: identifying a first set of spatial layers corresponding to a first set of channel eigenvalues and a second set of spatial layers corresponding to a second set of channel eigenvalues, wherein the first set of channel eigenvalues is below a threshold and the second set of channel eigenvalues is above the threshold; and allocating the first set of spatial layers for the data jointly modulated with the tone reservation signals based at least in part on the first set of channel eigenvalues being below the threshold; and allocating the second set of spatial layers for data modulated without tone reservation signals based at least in part on the second set of channel eigenvalues being above the threshold.

Aspect 9: The method of aspect 8, wherein communicating with the base station over the plurality of subcarriers comprises: communicating the data jointly modulated with the tone reservation signals via the first set of spatial layers.

Aspect 10: The method of any of aspects 1 through 9, further comprising: receiving an indication of a channel eigenvalue threshold from the base station, wherein a quantity of spatial layers to be used for joint modulation of data with tone reservation signals is based at least in part on the channel eigenvalue threshold.

Aspect 11: The method of any of aspects 1 through 10, further comprising: mapping each of the tone reservation signals to a defined symbol location of a constellation map used for data modulation in accordance with a hard slicing procedure.

Aspect 12: The method of aspect 11, wherein the first message indicates a capability of the UE to support joint modulation of data with tone reservation signals in accordance with the hard slicing procedure.

Aspect 13: The method of any of aspects 11 through 12, wherein the second message activates joint modulation of data with tone reservation signals in accordance with the hard slicing procedure.

Aspect 14: A method for wireless communications at a base station, comprising: receiving, from a UE, a first message indicating a capability of the UE to jointly modulate data with tone reservation signals on an individual subcarrier basis; transmitting, based at least in part on the first message, a second message activating joint modulation of data with tone reservation signals for the UE; and communicating with the UE over a plurality of subcarriers in accordance with the second message, wherein one or more subcarriers of the plurality of subcarriers carry data jointly modulated with tone reservation signals on the individual subcarrier basis.

Aspect 15: The method of aspect 14, further comprising: receiving, from the UE, one or more sounding reference signals; and determining a downlink channel estimate, a quantity of spatial layers to be used for joint modulation of data with tone reservation signals, a quantity of subcarriers to be used for joint modulation of data with tone reservation signals, a channel eigenvalue threshold associated with the quantity of subcarriers, or any combination thereof based at least in part on the one or more sounding reference signals.

Aspect 16: The method of any of aspects 14 through 15, further comprising: transmitting control signaling indicating whether joint modulation of data with tone reservation signals is activated for the UE, a quantity of subcarriers to be used for joint modulation of data with tone reservation signals, one or more search metrics associated with the quantity of subcarriers to be used for joint modulation of data with tone reservation signals, a precoding scheme to be used for joint modulation of data with tone reservation signals, or any combination thereof, wherein communicating with the UE over the plurality of subcarriers is based at least in part on the control signaling.

Aspect 17: The method of aspect 16, wherein the one or more search metrics comprise a channel energy threshold, a channel capacity threshold, a channel covariance matrix condition number threshold, a channel covariance matrix determinant threshold, a channel covariance matrix eigenvalue summation threshold, a channel covariance matrix eigenvalue threshold, or any combination thereof.

Aspect 18: The method of any of aspects 16 through 17, wherein the precoding scheme comprises a singular value decomposition precoding scheme.

Aspect 19: The method of any of aspects 16 through 18, wherein the quantity of subcarriers to be used for joint modulation of data with tone reservation signals is indicated as a percentage of the plurality of subcarriers.

Aspect 20: The method of any of aspects 16 through 19, wherein the control signaling comprises a radio resource control message, a medium access control-control element, an instance of downlink control information, or any combination thereof.

Aspect 21: The method of any of aspects 14 through 20, further comprising: identifying a first set of spatial layers corresponding to a first set of channel eigenvalues and a second set of spatial layers corresponding to a second set of channel eigenvalues, wherein the first set of channel eigenvalues is below a threshold and the second set of channel eigenvalues is above the threshold; and allocating the first set of spatial layers for the data jointly modulated with the tone reservation signals based at least in part on the first set of channel eigenvalues being below the threshold; and allocating the second set of spatial layers for data modulated without tone reservation signals based at least in part on the second set of channel eigenvalues being above the threshold.

Aspect 22: The method of aspect 21, wherein communicating with the UE over the plurality of subcarriers comprises: communicating the data jointly modulated with the tone reservation signals via the first set of spatial layers.

Aspect 23: The method of any of aspects 14 through 22, further comprising: transmitting an indication of a channel eigenvalue threshold, wherein a quantity of spatial layers to be used for joint modulation of data with tone reservation signals is based at least in part on the channel eigenvalue threshold.

Aspect 24: The method of any of aspects 14 through 23, wherein a code rate to be used for joint modulation of data with tone reservation signals or a transfer block size to be used for joint modulation of data with tone reservation signals is based at least in part on a quantity of spatial layers to be used for joint modulation of data with tone reservation signals.

Aspect 25: The method of any of aspects 14 through 24, further comprising: transmitting control signaling indicating a dynamic rank percentage to be used for joint modulation of data with tone reservation signals, wherein communicating with the UE over the plurality of subcarriers is based at least in part on the control signaling.

Aspect 26: The method of any of aspects 14 through 25, further comprising: mapping each of the tone reservation signals to a defined symbol location of a constellation map used for data modulation in accordance with a hard slicing procedure.

Aspect 27: The method of aspect 26, wherein the first message indicates a capability of the UE to support joint modulation of data with tone reservation signals in accordance with the hard slicing procedure.

Aspect 28: The method of any of aspects 26 through 27, wherein the second message activates joint modulation of data with tone reservation signals in accordance with the hard slicing procedure.

Aspect 29: An apparatus for wireless communications at a UE, comprising a processor; memory coupled with the processor; and instructions stored in the memory and executable by the processor to cause the apparatus to perform a method of any of aspects 1 through 13.

Aspect 30: An apparatus for wireless communications at a UE, comprising at least one means for performing a method of any of aspects 1 through 13.

Aspect 31: A non-transitory computer-readable medium storing code for wireless communications at a UE, the code comprising instructions executable by a processor to perform a method of any of aspects 1 through 13.

Aspect 32: An apparatus for wireless communications at a base station, comprising a processor; memory coupled with the processor; and instructions stored in the memory and executable by the processor to cause the apparatus to perform a method of any of aspects 14 through 28.

Aspect 33: An apparatus for wireless communications at a base station, comprising at least one means for performing a method of any of aspects 14 through 28.

Aspect 34: A non-transitory computer-readable medium storing code for wireless communications at a base station, the code comprising instructions executable by a processor to perform a method of any of aspects 14 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

Additional disclosure and examples related to the present description are provided in the attached appendix.

What is claimed is:

1. An apparatus for wireless communications at a user equipment (UE), comprising:
   a processor;
   memory coupled with the processor; and
   instructions stored in the memory and executable by the processor to cause the apparatus to:
      transmit a first message indicating a capability of the UE to jointly modulate data with tone reservation signals on an individual subcarrier basis;
      receive, from a base station and based at least in part on the first message, a second message activating joint modulation of data with tone reservation signals for the UE; and
      communicate with the base station over a plurality of subcarriers in accordance with the second message, wherein one or more subcarriers of the plurality of subcarriers carry data jointly modulated with tone reservation signals on the individual subcarrier basis.

2. The apparatus of claim 1, wherein the instructions are further executable by the processor to cause the apparatus to:
   receive, from the base station, control signaling indicating one or more search metrics, the one or more search metrics comprising a channel energy threshold, a channel capacity threshold, a channel covariance matrix condition number threshold, a channel covariance matrix determinant threshold, a channel covariance matrix eigenvalue summation threshold, a channel covariance matrix eigenvalue threshold, or any combination thereof;
   receive, from the base station, one or more demodulation reference signals; and
   identify the one or more subcarriers of the plurality of subcarriers based at least in part on the one or more search metrics and the one or more demodulation reference signals.

3. The apparatus of claim 1, wherein the instructions are further executable by the processor to cause the apparatus to:
   receive, from the base station, control signaling indicating a quantity of subcarriers to be used for joint modulation of data with tone reservation signals, one or more search metrics associated with the quantity of subcarriers, a quantity of spatial layers to be used for joint modulation of data with tone reservation signals, a precoding scheme to be used for joint modulation of data with tone reservation signals, or any combination thereof, wherein communicating with the base station over the plurality of subcarriers is based at least in part on the control signaling.

4. The apparatus of claim 3, wherein the precoding scheme comprises a singular value decomposition precoding scheme.

5. The apparatus of claim 3, wherein the quantity of subcarriers to be used for joint modulation of data with tone reservation signals is indicated as a percentage of the plurality of subcarriers.

6. The apparatus of claim 3, wherein the instructions are further executable by the processor to cause the apparatus to:
   perform joint modulation of data with tone reservation signals in accordance with one or both of a diagonalization precoding scheme or the precoding scheme indicated by the control signaling.

7. The apparatus of claim 3, wherein the control signaling comprises a radio resource control message, a medium access control-control element, an instance of downlink control information, or any combination thereof.

8. The apparatus of claim 1, wherein the instructions are further executable by the processor to cause the apparatus to:
identify a first set of spatial layers corresponding to a first set of channel eigenvalues and a second set of spatial layers corresponding to a second set of channel eigenvalues, wherein the first set of channel eigenvalues is below a threshold and the second set of channel eigenvalues is above the threshold; and
allocate the first set of spatial layers for the data jointly modulated with the tone reservation signals based at least in part on the first set of channel eigenvalues being below the threshold; and
allocate the second set of spatial layers for data modulated without tone reservation signals based at least in part on the second set of channel eigenvalues being above the threshold.

9. The apparatus of claim 8, wherein the instructions to communicate with the base station over the plurality of subcarriers are executable by the processor to cause the apparatus to:
communicate the data jointly modulated with the tone reservation signals via the first set of spatial layers.

10. The apparatus of claim 1, wherein the instructions are further executable by the processor to cause the apparatus to:
receive an indication of a channel eigenvalue threshold from the base station, wherein a quantity of spatial layers to be used for joint modulation of data with tone reservation signals is based at least in part on the channel eigenvalue threshold.

11. The apparatus of claim 1, wherein the instructions are further executable by the processor to cause the apparatus to:
map each of the tone reservation signals to a defined symbol location of a constellation map used for data modulation in accordance with a hard slicing procedure.

12. The apparatus of claim 11, wherein the first message indicates a capability of the UE to support joint modulation of data with tone reservation signals in accordance with the hard slicing procedure.

13. The apparatus of claim 11, wherein the second message activates joint modulation of data with tone reservation signals in accordance with the hard slicing procedure.

14. An apparatus for wireless communications at a base station, comprising:
a processor;
memory coupled with the processor; and
instructions stored in the memory and executable by the processor to cause the apparatus to:
receive, from a user equipment (UE), a first message indicating a capability of the UE to jointly modulate data with tone reservation signals on an individual subcarrier basis;
transmit, based at least in part on the first message, a second message activating joint modulation of data with tone reservation signals for the UE; and
communicate with the UE over a plurality of subcarriers in accordance with the second message, wherein one or more subcarriers of the plurality of subcarriers carry data jointly modulated with the tone reservation signals on the individual subcarrier basis.

15. The apparatus of claim 14, wherein the instructions are further executable by the processor to cause the apparatus to:
receive, from the UE, one or more sounding reference signals; and
determine a downlink channel estimate, a quantity of spatial layers to be used for joint modulation of data with tone reservation signals, a quantity of subcarriers to be used for joint modulation of data with tone reservation signals, a channel eigenvalue threshold associated with the quantity of subcarriers, or any combination thereof based at least in part on the one or more sounding reference signals.

16. The apparatus of claim 14, wherein the instructions are further executable by the processor to cause the apparatus to:
transmit control signaling indicating whether joint modulation of data with tone reservation signals is activated for the UE, a quantity of subcarriers to be used for joint modulation of data with tone reservation signals, one or more search metrics associated with the quantity of subcarriers to be used for joint modulation of data with tone reservation signals, a precoding scheme to be used for joint modulation of data with tone reservation signals, or any combination thereof, wherein communicating with the UE over the plurality of subcarriers is based at least in part on the control signaling.

17. The apparatus of claim 16, wherein the one or more search metrics comprise a channel energy threshold, a channel capacity threshold, a channel covariance matrix condition number threshold, a channel covariance matrix determinant threshold, a channel covariance matrix eigenvalue summation threshold, a channel covariance matrix eigenvalue threshold, or any combination thereof.

18. The apparatus of claim 16, wherein the precoding scheme comprises a singular value decomposition precoding scheme.

19. The apparatus of claim 16, wherein the quantity of subcarriers to be used for joint modulation of data with tone reservation signals is indicated as a percentage of the plurality of subcarriers.

20. The apparatus of claim 16, wherein the control signaling comprises a radio resource control message, a medium access control-control element, an instance of downlink control information, or any combination thereof.

21. The apparatus of claim 14, wherein the instructions are further executable by the processor to cause the apparatus to:
identify a first set of spatial layers corresponding to a first set of channel eigenvalues and a second set of spatial layers corresponding to a second set of channel eigenvalues, wherein the first set of channel eigenvalues is below a threshold and the second set of channel eigenvalues is above the threshold; and
allocate the first set of spatial layers for the data jointly modulated with the tone reservation signals based at least in part on the first set of channel eigenvalues being below the threshold; and
allocate the second set of spatial layers for data modulated without tone reservation signals based at least in part on the second set of channel eigenvalues being above the threshold.

22. The apparatus of claim 21, wherein the instructions to communicate with the UE over the plurality of subcarriers are executable by the processor to cause the apparatus to:
communicate the data jointly modulated with the tone reservation signals via the first set of spatial layers.

23. The apparatus of claim 14, wherein the instructions are further executable by the processor to cause the apparatus to:

transmit an indication of a channel eigenvalue threshold, wherein a quantity of spatial layers to be used for joint modulation of data with tone reservation signals is based at least in part on the channel eigenvalue threshold.

24. The apparatus of claim 14, wherein a code rate to be used for joint modulation of data with tone reservation signals or a transfer block size to be used for joint modulation of data with tone reservation signals is based at least in part on a quantity of spatial layers to be used for joint modulation of data with tone reservation signals.

25. The apparatus of claim 14, wherein the instructions are further executable by the processor to cause the apparatus to:
transmit control signaling indicating a dynamic rank percentage to be used for joint modulation of data with tone reservation signals, wherein communicating with the UE over the plurality of subcarriers is based at least in part on the control signaling.

26. The apparatus of claim 14, wherein the instructions are further executable by the processor to cause the apparatus to:
map each of the tone reservation signals to a defined symbol location of a constellation map used for data modulation in accordance with a hard slicing procedure.

27. The apparatus of claim 26, wherein the first message indicates a capability of the UE to support joint modulation of data with tone reservation signals in accordance with the hard slicing procedure.

28. The apparatus of claim 26, wherein the second message activates joint modulation of data with tone reservation signals in accordance with the hard slicing procedure.

29. A method for wireless communications at a user equipment (UE), comprising:
transmitting a first message indicating a capability of the UE to jointly modulate data with tone reservation signals on an individual subcarrier basis;
receiving, from a base station and based at least in part on the first message, a second message activating joint modulation of data with tone reservation signals for the UE; and
communicating with the base station over a plurality of subcarriers in accordance with the second message, wherein one or more subcarriers of the plurality of subcarriers carry data jointly modulated with tone reservation signals on the individual subcarrier basis.

30. A method for wireless communications at a base station, comprising:
receiving, from a user equipment (UE), a first message indicating a capability of the UE to jointly modulate data with tone reservation signals on an individual subcarrier basis;
transmitting, based at least in part on the first message, a second message activating joint modulation of data with tone reservation signals for the UE; and
communicating with the UE over a plurality of subcarriers in accordance with the second message, wherein one or more subcarriers of the plurality of subcarriers carry data jointly modulated with tone reservation signals on the individual subcarrier basis.

* * * * *